United States Patent
Tsuji et al.

(10) Patent No.: US 11,017,318 B2
(45) Date of Patent: May 25, 2021

(54) INFORMATION PROCESSING SYSTEM, INFORMATION PROCESSING METHOD, PROGRAM, AND VEHICLE FOR GENERATING A FIRST DRIVER MODEL AND GENERATING A SECOND DRIVER MODEL USING THE FIRST DRIVER MODEL

(71) Applicant: Panasonic Intellectual Property Management Co., Ltd., Osaka (JP)

(72) Inventors: Masanaga Tsuji, Osaka (JP); Hideto Motomura, Kyoto (JP); Sahim Kourkouss, Osaka (JP); Jeffry Fernando, Osaka (JP); Koichi Emura, Kanagawa (JP); Eriko Ohdachi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/479,872

(22) PCT Filed: Jan. 25, 2018

(86) PCT No.: PCT/JP2018/002273
§ 371 (c)(1),
(2) Date: Jul. 22, 2019

(87) PCT Pub. No.: WO2018/139531
PCT Pub. Date: Aug. 2, 2018

(65) Prior Publication Data
US 2020/0210889 A1    Jul. 2, 2020

(30) Foreign Application Priority Data

Jan. 26, 2017  (JP) .............................. JP2017-012326

(51) Int. Cl.
*G06N 20/00* (2019.01)
*G07C 5/00* (2006.01)
(Continued)

(52) U.S. Cl.
CPC ............. *G06N 20/00* (2019.01); *G07C 5/008* (2013.01); *G07C 5/085* (2013.01); *G05D 1/0088* (2013.01)

(58) Field of Classification Search
CPC ......... G06N 20/00; G07C 5/008; G07C 5/085
See application file for complete search history.

(56) References Cited

U.S. PATENT DOCUMENTS

2009/0234552 A1   9/2009  Takeda et al.
2013/0325483 A1   12/2013 Tzirkel-Hancock et al.
(Continued)

FOREIGN PATENT DOCUMENTS

DE   102013209778 A1   12/2013
DE   102013010930 A1   12/2014
(Continued)

OTHER PUBLICATIONS

Lefèvre, et al. Autonomous Car Following: A Learning-Based Approach. 2015 IEEE Intelligent Vehicles Symposium (IV) Jun. 28-Jul. 1, 2015. COEX, Seoul, Korea (Year: 2015).*

(Continued)

*Primary Examiner* — Alexey Shmatov
*Assistant Examiner* — Robert Bejcek, II
(74) *Attorney, Agent, or Firm* — Greenblum & Bernstein, P.L.C.

(57) ABSTRACT

An information processing system receives first travel histories from vehicles that belong to vehicle type A, learns based on the first travel histories to build a first driver model that represents relation between travel situations and behaviors of the vehicles that belong to a first vehicle type, receives second travel histories from vehicles that belong to vehicle type X that is different from vehicle type A, and (Continued)

performs transfer learning in which the second travel histories are used for the first driver model to build a second driver model that represents relation between travel situations and behaviors of the vehicles that belong to vehicle type X.

11 Claims, 17 Drawing Sheets

(51) Int. Cl.
    *G07C 5/08*     (2006.01)
    *G05D 1/00*     (2006.01)

(56) References Cited

U.S. PATENT DOCUMENTS

| | | | |
|---|---|---|---|
| 2014/0244125 A1* | 8/2014 | Dorum | G08B 23/00 701/70 |
| 2015/0151637 A1 | 6/2015 | Suzuki et al. | |
| 2015/0371464 A1* | 12/2015 | Fujimori | E02F 9/2054 701/29.1 |
| 2016/0144865 A1 | 5/2016 | Stadler | |
| 2016/0247394 A1* | 8/2016 | Stenneth | G07C 5/008 |
| 2017/0174221 A1 | 6/2017 | Vaughn et al. | |
| 2018/0319405 A1 | 11/2018 | Heinze et al. | |

FOREIGN PATENT DOCUMENTS

| | | |
|---|---|---|
| DE | 102016200759 A1 | 5/2017 |
| DE | 102016217092 A1 | 3/2018 |
| DE | 112016005835 T5 | 9/2018 |
| JP | 2005-067483 | 3/2005 |
| JP | 2007-176396 | 7/2007 |
| JP | 2009-237937 | 10/2009 |
| JP | 5051542 B | 10/2012 |
| JP | 2014-038047 | 2/2014 |
| WO | 2017/105755 A1 | 6/2017 |

OTHER PUBLICATIONS

Weiss et al. A survey of transfer learning. Weiss et al. J Big Data (2016) 3:9 (Year: 2016).*
Gruyer et al. From Virtual To Reality, How To Prototype, Test And Evaluate New ADAS: Application To Automatic Car Parking. 2014 IEEE Intelligent Vehicles Symposium (IV) Jun. 8-11, 2014. Dearborn, Michigan, USA (Year: 2014).*
International Search Report of PCT application No. PCT/JP2018/002273 dated May 1, 2018.
German Office Action and English Translation thereof dated Nov. 18, 2019 for the related German Patent Application No. 11 2018 000 541.0.

* cited by examiner

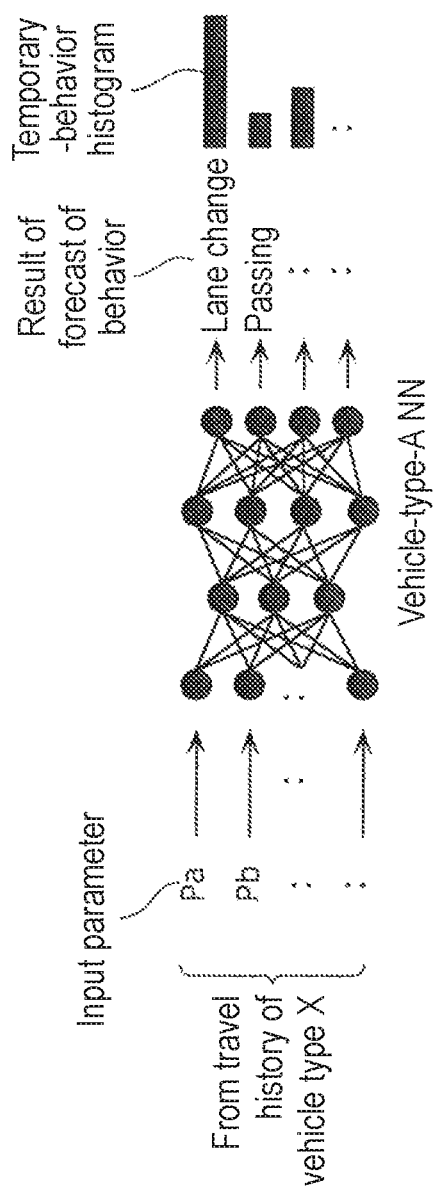

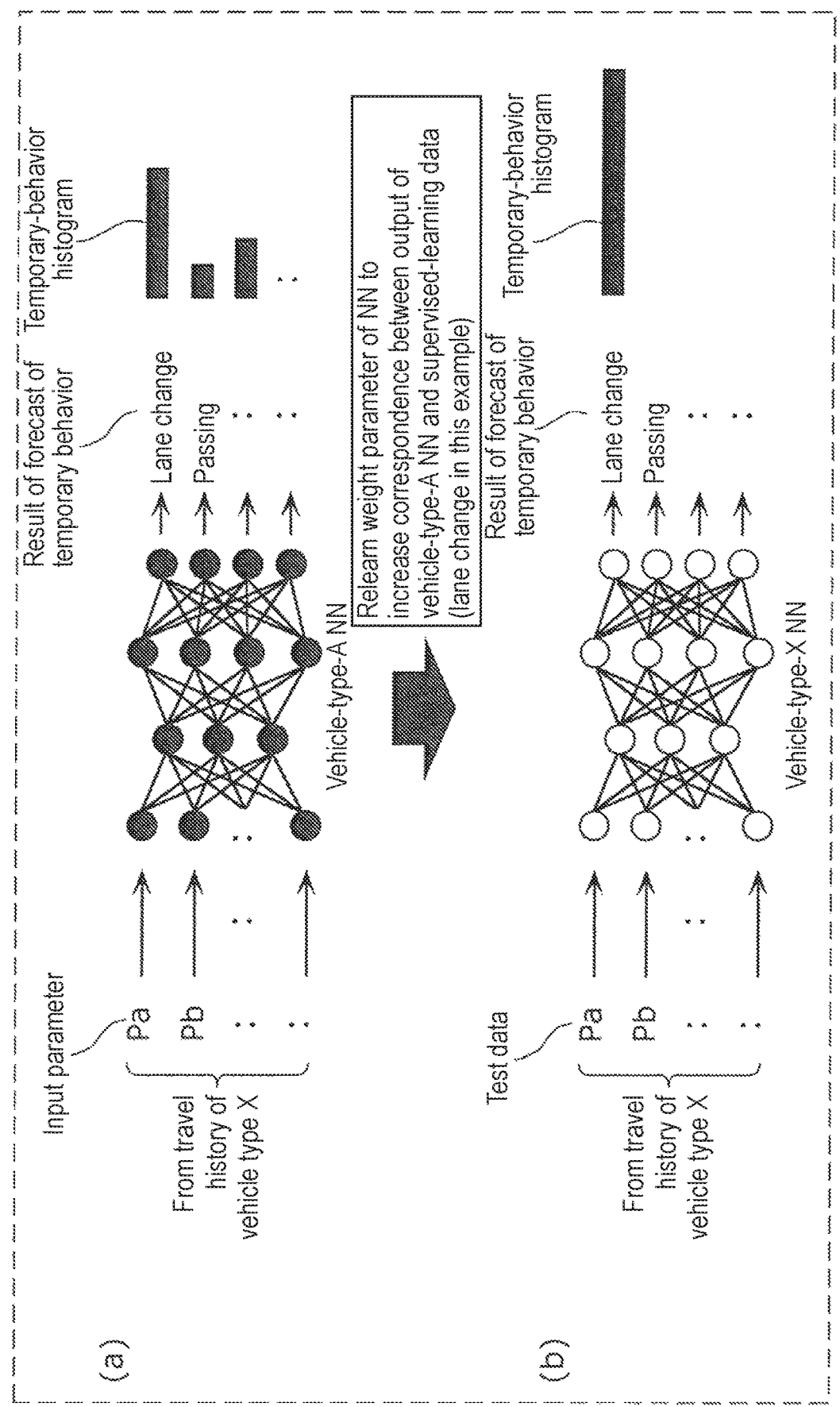

FIG. 11

| History | Behavior | Travel situation | | | | | | | | | | | | | | | |
|---|---|---|---|---|---|---|---|---|---|---|---|---|---|---|---|---|---|
| | | Information about own vehicle | Information about vehicle in front of own vehicle | | Information about vehicle to rear left or right of own vehicle | | | | Information about vehicle to left or right of own vehicle | | | | Information about merging lanes | | | Information about position | |
| | | | | | Vehicle to rear left or rear right of own vehicle | | | | Vehicle to front left or front right of own vehicle | | | | | | | Lane that own vehicle is travelling | Distance between own vehicle and merging point |
| | | Va | Vba | DRba | RSb | Vca | Dca | Rca | Vda | Dda | Rda | DRda | Vma | Dma | Rma | | |
| (a) | Deceleration | 4 | 1 | 2 | 5 | 4 | 2 | 2 | 3 | 3 | 1 | 3 | 0 | 0 | 0 | 1 | 0 |
| (b) | Lane change | 3 | 2 | 5 | 4 | 2 | 2 | 1 | 0 | 0 | 0 | 10 | 1 | 2 | 3 | 1 | 4 |
| (c) | Deceleration | 3 | 2 | 5 | 4 | 3 | 1 | 3 | 3 | 1 | 3 | 2 | 2 | 2 | 2 | 1 | 4 |
| … | … | … | … | … | … | … | … | … | … | … | … | … | … | … | … | … | … |

Supervised-learning data

Input parameter

INFORMATION PROCESSING SYSTEM, INFORMATION PROCESSING METHOD, PROGRAM, AND VEHICLE FOR GENERATING A FIRST DRIVER MODEL AND GENERATING A SECOND DRIVER MODEL USING THE FIRST DRIVER MODEL

CROSS-REFERENCE TO RELATED APPLICATIONS

This application is a U.S. national stage application of the PCT International Application No. PCT/JP2018/002273 filed on Jan. 25, 2018, which claims the benefit of foreign priority of Japanese patent application No. 2017-012326 filed on Jan. 26, 2017, the contents all of which are incorporated herein by reference.

TECHNICAL FIELD

The present invention relates to an information processing system, an information processing method, a program, and a vehicle that process information related to a vehicle.

BACKGROUND ART

In recent years, various techniques related to autonomous driving are proposed. That is, vehicles are proposed that perform manually controlled driving in which a driver drives and autonomous driving in which part or all of driving is autonomously performed, based on a situation around the vehicles and condition of travel of the vehicles. For example, the situation around the vehicles and the condition of travel of the vehicles are a speed of an own vehicle, and condition of steering, an accelerator, a brake, direction indicators, or actuators. Techniques related to fully autonomous vehicles are also proposed, and put to practical use.

For example, PTL 1 discloses a travel control device that allows a driver to visually recognize state of operation of autonomous steering control or autonomous acceleration/deceleration control if the vehicle is autonomously steered or autonomously accelerated or decelerated.

CITATION LIST

Patent Literature

PTL 1: Unexamined Japanese Patent Publication No. 2005-67483

SUMMARY OF THE INVENTION

The present invention provides an information processing system and the like that forecast behaviors appropriate for vehicles.

An information processing system according to one aspect of the present invention is an information processing system that includes at least one processor. The at least one processor receives at least one first travel history from each of n, where n is an integer that is larger than or equal to two, vehicles that belong to a first vehicle type, and learns based on the respective first travel history to build a first driver model that represents relation between a travel situation and a behavior of each of the n vehicles that belong to the first vehicle type. The at least one processor receives at least one second travel history from each of m, where m is an integer that is smaller than n, vehicles that belong to a second vehicle type that is different from the first vehicle type, and performs transfer learning in which the respective second travel history is used for the first driver model to build a second driver model that represents relation between a travel situation and a behavior of each of the m vehicles that belong to the second vehicle type. For example, the vehicles that belong to the first vehicle type are regular vehicles, and the vehicles that belong to the second vehicle type are luxury vehicles.

Consequently, even if a few travel histories are received from the vehicles that belong to the second vehicle type, such as a scarce luxury vehicle, a driver model that is appropriate for the second vehicle type is built. That is, a driver model of the second vehicle type as the second driver model is built by transfer learning for the first driver model built with many travel histories received from vehicles that belong to the first vehicle type, such as an abundant regular vehicle. Therefore, even if a number of the vehicles that belong to the second vehicle type is small, the driver model of the second vehicle type is appropriately built. Consequently, the second driver model is used to forecast a behavior that is appropriate for vehicles that belong to the second vehicle type.

The information processing system further includes: at least one first detector that detects a situation of surroundings that belongs to the first vehicle type; and at least one second detector that detects a situation of surroundings that belongs to the second vehicle type. The at least one processor further may generate the at least one first travel history that includes a situation around the vehicle detected by the at least one first detector, as a travel situation of the vehicle that belongs to the first vehicle type, and may generate the at least one second travel history that includes a situation around the vehicle detected by the at least one second detector, as a travel situation of the vehicle that belongs to the second vehicle type.

Consequently, the first travel history and the second travel history are generated. The first travel history and the second travel history each include a travel situation that is a situation related to objects around the vehicle, or other vehicles that travel around the vehicle, for example. The objects around the vehicle include a white line on a road, or obstacles, for example. The other vehicles include a vehicle that travels in front of the vehicle, for example. Therefore, the first driver model and the second driver model are built that each reflect situations around the vehicle.

When a format of a parameter that represents a situation of surroundings detected by the at least one first detector is different from a format of a parameter that represents a situation of surroundings detected by the at least one second detector, the at least one processor may convert a format of a parameter of at least one of the at least one first detector and the at least one second detector to generate the at least one first travel history and the at least one second travel history that each include a travel situation represented by a unified format. For example, the at least one processor may convert a format of a parameter of at least one first detector and a format of a parameter of at least one second detector into a predetermined format.

Consequently, even if a format of a parameter that represents a situation of surroundings that belongs to the first vehicle type detected by the vehicle that belongs to the first vehicle type is different from a format of a parameter that represents a situation of surroundings that belongs to the second vehicle type detected by the vehicle that belongs to the second vehicle type, a format of a first travel history and a format of a second travel history are unified. Therefore, the first travel history and the second travel history whose formats are unified facilitate transfer learning from the first driver model to the second driver model.

The at least one processor may forecast a behavior of the vehicle that belongs to the second vehicle type, and the behavior is a behavior related to a parameter that represents a situation around the vehicle detected by the at least one second detector in the second driver model.

Consequently, a behavior appropriate for vehicles that belong to the second vehicle type, such as a luxury vehicle, is forecast.

The at least one processor includes: first processors of the vehicles that belong to the first vehicle type; second processors of the vehicles that belong to the second vehicle type; and a third processor of a server. The first processors may transmit, to the server, the at least one first travel history generated by travel of the vehicles that belong to the first vehicle type, the second processors may transmit, to the server, the at least one second travel history generated by travel of the vehicles that belong to the second vehicle type, and the third processor may receive the at least one first travel history from the vehicles that belong to the first vehicle type, and may receive the at least one second travel history from the vehicles that belong to the second vehicle type. The third processor may transmit the second driver model built to the second processors.

Consequently, learning and transfer learning whose processes are relatively heavy loads are performed by the server. Therefore, processes performed by the first vehicles and the second vehicles become lighter loads.

The at least one processor further receives respective third travel history from each of k, where k is an integer that is larger than m, vehicles that belong to a third vehicle type, learns based on the respective third travel history to build a third driver model that represents relation between a travel situation and a behavior of each of the k vehicles that belong to the third vehicle type. When the at least one processor is informed that the third driver model is selected from the first driver model and the third driver model, the at least one processor may build the second driver model by transfer learning in which the at least one second travel history is used for the third driver model.

Consequently, one of the second driver model based on the third driver model and the second driver model based on the first driver model is selected and built. Consequently, the second driver model based on the third driver model has travel characteristics similar to travel characteristics of the third vehicle type. Therefore, when the second driver model based on the third driver model is used, a behavior that corresponds to the travel characteristics similar to the travel characteristics of the third vehicle type is forecast. Further, the second driver model based on the first driver model has travel characteristics similar to travel characteristics of the first vehicle type. Therefore, when the second driver model based on the first driver model is used, a behavior that corresponds to the travel characteristics similar to the travel characteristics of the first vehicle type is forecast.

The at least one processor may determine whether a plurality of vehicle types that are predetermined and usable for transfer learning include the first vehicle type and the third vehicle type, and may build the first driver model and the third driver model when the at least one processor determines that the first vehicle type and the third vehicle type are included.

Consequently, a driver model of a vehicle type that is not usable for transfer learning is not built.

Note that these comprehensive or specific aspects may be implemented by a system, a method, an integrated circuit, a computer program, or a (non-transitory) storage medium, such as a computer-readable compact disk read-only memory (CD-ROM), or may be implemented by any combination of a system, a method, an integrated circuit, computer a program, and a storage medium.

An information processing system according to the present invention forecasts behaviors appropriate for vehicles.

BRIEF DESCRIPTION OF DRAWINGS

FIG. 9 illustrates an example of forecast of a temporary behavior with the vehicle-type-A neural network according to the exemplary embodiment.

FIG. 10 illustrates an example of a method of building a vehicle-type-X neural network according to the exemplary embodiment.

FIG. 11 illustrates an example of a travel history according to the exemplary embodiment.

DESCRIPTION OF EMBODIMENTS

Before exemplary embodiments of the present invention are described, problems of conventional devices will be briefly described. Forecast of behaviors (also referred to as driving actions, driving behaviors, or driving operation)

appropriate for a vehicle may be difficult for the travel control device (i.e. an information processing system) in PTL 1 in some cases.

Hereinafter, exemplary embodiments will be specifically described with reference to the drawings.

The following exemplary embodiments describe comprehensive or specific examples. Numerical values, shapes, materials, components, positions where the components are arranged, modes in which the components are connected, steps, orders of steps, and the like described in the following exemplary embodiments are examples, and therefore are not intended to limit the present invention. Among the components in the following exemplary embodiments, components that are not described in independent claims that show the most generic concepts will be described as optional components.

Each drawing is schematic, and is not necessarily precisely drawn. In each drawing, same components are denoted by same reference marks.

Exemplary Embodiment

Figure 1:
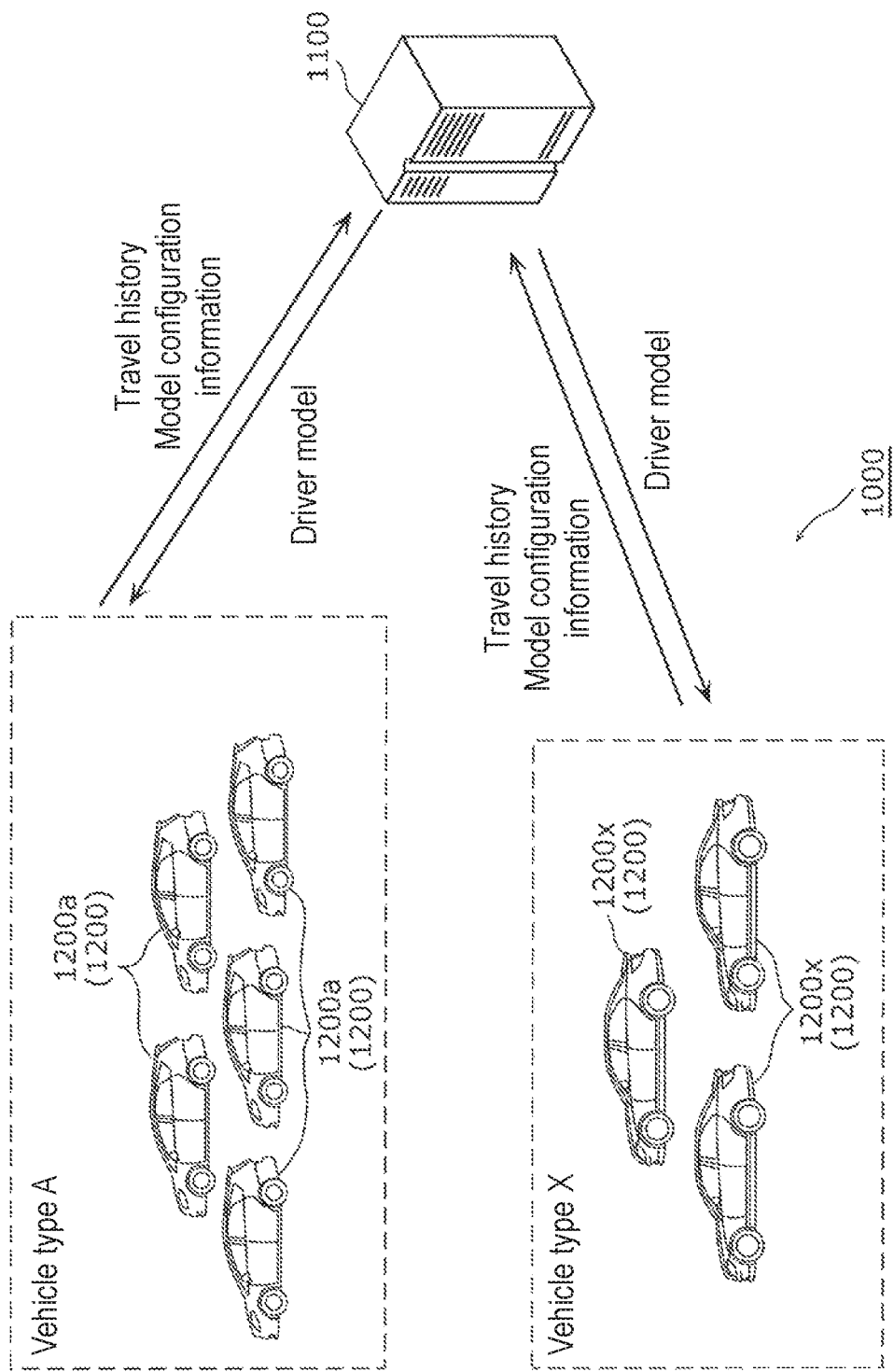
FIG. 1 illustrates a whole configuration of an information processing system according to an exemplary embodiment.

FIG. 1 illustrates a whole configuration of an information processing system according to an exemplary embodiment. Information processing system 1000 includes server 1100, a plurality of vehicles 1200a that belong to vehicle type A, and a plurality of vehicles 1200x that belong to vehicle type X. The plurality of vehicles 1200a of vehicle type A and the plurality of vehicles 1200x of vehicle type X are connected to server 1100 through a communication network, such as the Internet.

A number of the plurality of vehicles 1200a of vehicle type A is larger than a number of the plurality of vehicles 1200x of vehicle type X. For example, the plurality of vehicles 1200a of vehicle type A are regular vehicles, and the plurality of vehicles 1200x of vehicle type X are luxury vehicles. In the present exemplary embodiment, the plurality of vehicles 1200a of vehicle type A have a same configuration, as that of the plurality of vehicles 1200x of vehicle type X. Vehicles 1200a of vehicle type A and vehicles 1200x of vehicle type X are collectively referred to as vehicles 1200.

Each of vehicles 1200 generates a travel history and transmits the travel history to server 1100. The travel history includes a plurality of pairs of a travel situation of vehicle 1200 and a behavior selected by vehicle 1200 after a predetermined period of time passes from occurrence of the travel situation. The travel situation is at least one of a situation of vehicle 1200 and a situation around vehicle 1200. The travel situation is also referred to as a travel environment. Further, vehicle 1200 transmits model configuration information to server 1100. The model configuration information represents a configuration of a driver model that vehicle 1200 uses. The driver model represents relation between travel environments and behaviors of vehicle 1200. In the present exemplary embodiment, the driver model is a neural network. The neural network is an example of the driver model. The driver model may be another model. When the driver model is a neural network, the model configuration information represents a number of layers that constitute the neural network, a number of nodes of each of the layers, and a class of the whole neural network or a class of each of the layers. The number of the layers is three, for example. In the three layers, a number of nodes in an input layer is 100, for example. A number of nodes in an intermediate layer is 100, for example. A number of nodes in an output layer is 5, for example. A class of a range that includes a first layer and a second layer is a combination of a convolutional neural network (CNN) and max pooling, for example. A class of a range that includes a first layer and a second layer is a combination of a fully connected network and max pooling, for example.

Vehicle 1200 receives a driver model from server 1100. The driver model includes a configuration represented by the model configuration information. Vehicle 1200 uses the driver model to forecast a behavior. When a driver model is a neural network, vehicle 1200 receives, as the driver model, a weight parameter for each of the nodes of the neural network. That is, vehicle 1200 receives the weight parameter for each of the nodes of the neural network from server 1100, and uses the weight parameter for each of the nodes and the model configuration information described above to build a driver model that is a neural network. Consequently, a driver model is obtained.

Server 1100 builds driver models, based on travel histories and model configuration information transmitted from vehicles 1200. The built driver models include a vehicle-type-A driver model and a vehicle-type-X driver model. Then server 1100 transmits the built vehicle-type-A driver model to vehicles 1200a of vehicle type A. Further, server 1100 transmits the generated vehicle-type-X driver model to vehicles 1200x of vehicle type X.

Figure 2:
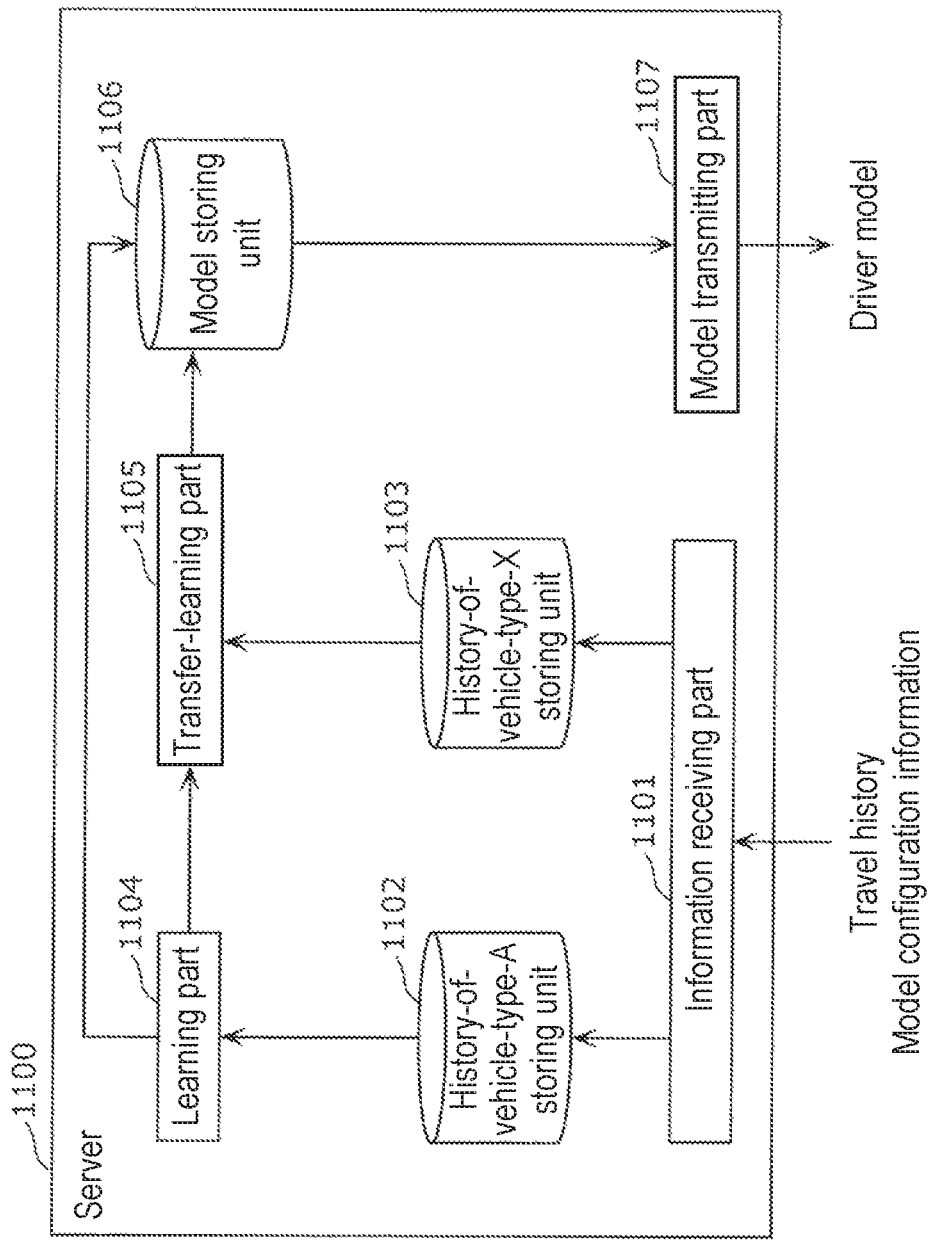
FIG. 2 is a block diagram that illustrates a configuration of functions of a server according to the exemplary embodiment.

FIG. 2 is a block diagram that illustrates a configuration of functions of server 1100.

Server 1100 includes information receiving part 1101, history-of-vehicle-type-A storing unit 1102, history-of-vehicle-type-X storing unit 1103, learning part 1104, transfer-learning part 1105, model storing unit 1106, and model transmitting part 1107.

Information receiving part 1101 receives travel histories and model configuration information from vehicles 1200. When vehicle 1200 is vehicle type A, information receiving part 1101 stores a travel history and model configuration information of vehicle 1200 in history-of-vehicle-type-A storing unit 1102. When vehicle 1200 is vehicle type X, information receiving part 1101 stores a travel history and model configuration information of vehicle 1200 in history-of-vehicle-type-X storing unit 1103.

History-of-vehicle-type-A storing unit 1102 and history-of-vehicle-type-X storing unit 1103 are each a storage medium that stores travel histories and model configuration information. The storage medium includes a hard disk drive, a memory, a random access memory (RAM), or a solid state drive (SSD), for example. History-of-vehicle-type-A storing unit 1102 stores a travel history and model configuration information transmitted from each of the plurality of vehicles 1200a of vehicle type A. History-of-vehicle-type-X storing unit 1103 stores a travel history and model configuration information transmitted from each of the plurality of vehicles 1200x of vehicle type X.

Learning part 1104 refers to the model configuration information stored in history-of-vehicle-type-A storing unit 1102 to build a driver model that includes a configuration represented by the model configuration information. At that time, learning part 1104 builds a vehicle-type-A driver model by learning. In the learning, learning part 1104 uses the respective travel histories of the plurality of vehicles 1200a of vehicle type A stored in history-of-vehicle-type-A storing unit 1102. In the learning, learning part 1104 uses a set of the respective travel histories of the plurality of vehicles 1200a of vehicle type A stored in history-of-vehicle-type-A storing unit 1102. Hereinafter, the set of the travel histories may be referred to as a travel history to simplify explanation.

Learning part 1104 outputs the built vehicle-type-A driver model to transfer-learning part 1105, and stores the built vehicle-type-A driver model in model storing unit 1106.

Transfer-learning part 1105 receives the vehicle-type-A driver model from learning part 1104. Further, transfer-learning part 1105 reads the respective travel histories and model configuration information of the plurality of vehicles 1200x of vehicle type X stored in history-of-vehicle-type-X storing unit 1103 Transfer-learning part 1105 reads a set of the respective travel histories of the plurality of vehicles 1200x of vehicle type X stored in history-of-vehicle-type-X storing unit 1103. Hereinafter, the set of the travel histories may be referred to as a travel history to simplify explanation.

Transfer-learning part 1105 determines whether a configuration represented by the model configuration information, in history-of-vehicle-type-X storing unit 1103, read by transfer-learning part 1105 corresponds to a configuration of the vehicle-type-A driver model received from learning part 1104 by transfer-learning part 1105. When transfer-learning part 1105 determines the correspondence, transfer-learning part 1105 performs transfer learning in which the travel histories in history-of-vehicle-type-X storing unit 1103 are used for the vehicle-type-A driver model. As a result of the transfer learning, transfer-learning part 1105 builds a vehicle-type-X driver model that represents relation between travel situations and behaviors of vehicles 1200x of vehicle type X. Transfer-learning part 1105 stores the vehicle-type-X driver model built as a result of the transfer learning in model storing unit 1106.

Model storing unit 1106 is a storage medium that stores the vehicle-type-A driver model and the vehicle-type-X driver model.

Model transmitting part 1107 reads the vehicle-type-A driver model in model storing unit 1106, and transmits the driver model to vehicles 1200a of vehicle type A. Further, model transmitting part 1107 reads the vehicle-type-X driver model in model storing unit 1106, and transmits the driver model to vehicles 1200x of vehicle type X.

For example, a processor and the like constitute the components in server 1100 except the storage media, such as history-of-vehicle-type-A storing unit 1102, history-of-vehicle-type-X storing unit 1103, and model storing unit 1106, in the present exemplary embodiment. That is, server 1100 includes at least one processor. The processor receives first travel histories from each of n (n is an integer that is larger than or equal to two) vehicles 1200a that belong to vehicle type A (i.e. a first vehicle type). The processor learns based on the first travel histories to build a first driver model that represents relation between travel situations and behaviors of vehicles 1200a that belong to vehicle type A. Further, the processor receives second travel histories from each of m (m is an integer that is smaller than n) vehicles 1200x that belong to vehicle type X (i.e. a second vehicle type) that is different from vehicle type A. Then the processor performs transfer learning in which the second travel histories are used for the first driver model. Consequently, the processor builds a second driver model that represents relation between travel situations and behaviors of vehicles 1200x that belong to vehicle type X. The first driver model is the vehicle-type-A driver model. The second driver model is the vehicle-type-X driver model.

Consequently, even if a few travel histories are received from vehicles 1200x that belong to vehicle type X, such as a scarce luxury vehicle, a driver model that is appropriate for vehicle type X is built. That is, the vehicle-type-X driver model is built by transfer learning for the vehicle-type-A driver model built with many travel histories received from vehicles 1200a that belong to vehicle type A, such as an abundant regular vehicle. Therefore, even if a number of vehicles 1200x that belong to vehicle type X is small, the vehicle-type-X driver model is appropriately and easily built.

Figure 3:
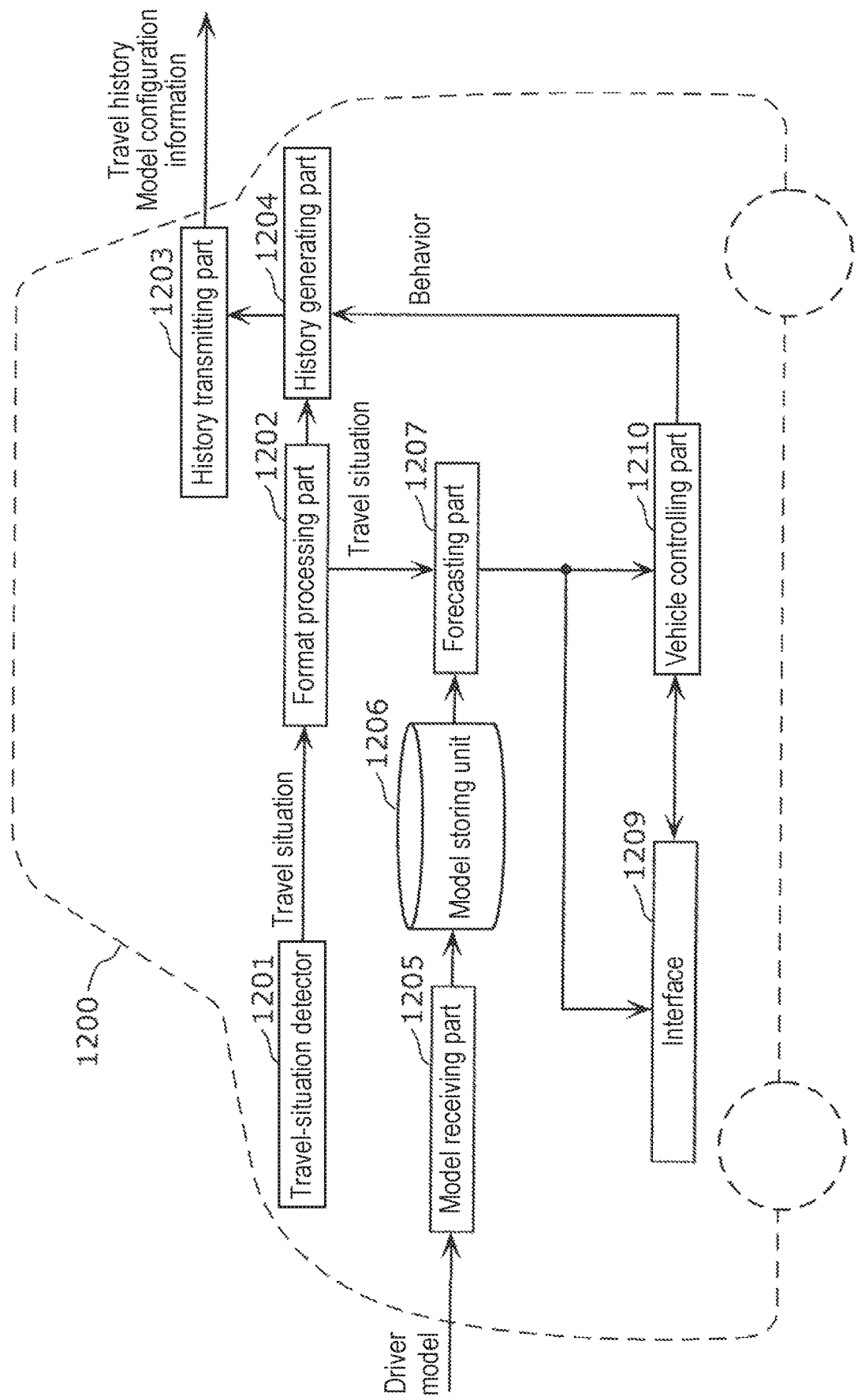
FIG. 3 is a block diagram that illustrates a configuration of functions of a vehicle according to the exemplary embodiment.

FIG. 3 is a block diagram that illustrates a configuration of functions of vehicles 1200.

Each of vehicles 1200 includes travel-situation detector 1201, format processing part 1202, history transmitting part 1203, history generating part 1204, model receiving part 1205, model storing unit 1206, forecasting part 1207, interface 1209, and vehicle controlling part 1210.

Travel-situation detector 1201 detects a travel situation in vehicle 1200, and outputs parameters that represent the travel situation to format processing part 1202. Specifically, travel-situation detector 1201 may detect, as the situation of vehicle 1200, a current position, velocity, acceleration, a travel direction, a position of an accelerator pedal, a position of a brake pedal, variation of the position of the accelerator pedal, variation of the position of the brake pedal, a steering angle of a steering wheel, or variation of the steering angle of vehicle 1200, a number of people in vehicle 1200, or condition of a driver. The current position of vehicle 1200 is detected by travel-situation detector 1201 that uses a global positioning system (GPS), for example. Further, travel-situation detector 1201 may detect a situation around vehicle 1200, such as obstacles around vehicle 1200, a white line on a road, positions of other vehicles, relative speeds of other vehicles, or an estimated time-to-collision (TTC), for example. The situation around vehicle 1200 is detected by a stereo camera, a millimeter-wave radar, or a laser radar of travel-situation detector 1201, for example.

Travel-situation detector 1201 of vehicle type A and travel-situation detector 1201 of vehicle type X may have different detection precision, and may have different formats of parameters that represent detected travel situations. For example, travel-situation detector 1201 of vehicle type A has detection precision that is lower than detection precision of travel-situation detector 1201 of vehicle type X.

Format processing part 1202 converts a format of parameters that represent travel situations detected by travel-situation detector 1201, as necessary. That is, a format of parameters that represent travel situations detected by travel-situation detector 1201 of vehicle type A may be different from a format of parameters that represent travel situations detected by travel-situation detector 1201 of vehicle type X. In that case, format processing part 1202 converts a format of parameters of at least one of travel-situation detector 1201 of vehicle type A (i.e. a first detector) and travel-situation detector 1201 of vehicle type X (i.e. a second detector). Consequently, a format of parameters that represent travel situations detected by travel-situation detector 1201 of vehicle type A and a format of parameters that represent travel situations detected by travel-situation detector 1201 of vehicle type X are unified.

History generating part 1204 receives a travel situation from format processing part 1202. A format of the travel situation has been converted, as necessary. Further, history generating part 1204 receives a behavior selected after the travel situation is detected, from vehicle controlling part 1210. Then history generating part 1204 generates a travel history that represents relation between the travel situation and the behavior, and outputs the travel history to history transmitting part 1203. As described above, a format of parameters that represent travel situations detected by travel-situation detector 1201 of vehicle type A and a format of parameters that represent travel situations detected by travel-situation detector 1201 of vehicle type X are unified. Therefore, history generating part 1204 of vehicle type A generates a first travel history that includes a travel situation represented in a unified format. Further, history generating part 1204 of vehicle type X generates a second travel history that includes a travel situation represented in a unified format.

History transmitting part 1203 transmits the travel history to server 1100. At that time, history transmitting part 1203 also transmits model configuration information to server 1100. The model configuration information represents a configuration of a driver model that vehicle 1200 uses.

Model receiving part 1205 receives a driver model that corresponds to a vehicle type of vehicle 1200 from server 1100, and stores the driver model in model storing unit 1206.

Model storing unit 1206 is a storage medium that stores the driver model.

Forecasting part 1207 reads the driver model in model storing unit 1206, and receives a current travel situation from travel-situation detector 1201 through format processing part 1202. Then forecasting part 1207 inputs the travel situation to the driver model to forecast a behavior of vehicle 1200. The forecast behavior of vehicle 1200 is related to the travel situation in the driver model.

For example, interface 1209 includes a monitor that displays images, and operating parts operated by a driver. Interface 1209 functions as an interface between a system of vehicle 1200 and the driver. Interface 1209 displays a behavior forecast by forecasting part 1207, and other behaviors on the monitor. Then, when interface 1209 is not operated by the driver, interface 1209 instructs vehicle controlling part 1210 that vehicle 1200 performs the forecast behavior. Alternatively, when interface 1209 is operated by the driver and thus receives another behavior that is not the forecast behavior, interface 1209 instructs vehicle controlling part 1210 that vehicle 1200 performs the behavior that is not the forecast behavior.

Vehicle controlling part 1210 causes vehicle 1200 to perform a behavior forecast by forecasting part 1207 or a behavior received by operation of the driver. Then vehicle controlling part 1210 outputs the behavior performed by vehicle 1200 to history generating part 1204. A behavior output to history generating part 1204 may be a behavior selected by operation of a driver, or a behavior selected by manually controlled driving.

As described above, information processing system 1000 according to the present exemplary embodiment includes travel-situation detectors 1201 (i.e. detectors of the first vehicle type) that detect situations around vehicles 1200*a* that belong to vehicle type A (i.e. the first vehicle type), and travel-situation detectors 1201 (i.e. detectors of the second vehicle type) that detect situations around vehicles 1200*x* that belong to vehicle type X (i.e. the second vehicle type). For example, a processor and the like constitute the above components included in each of vehicles 1200 except travel-situation detector 1201, model storing unit 1206, and interface 1209. That is, vehicle 1200 includes at least one processor. A processor of vehicle 1200*a* of vehicle type A generates the above first travel history that includes a travel situation of vehicle 1200*a* that belongs to vehicle type A. The travel situation of vehicle 1200*a* that belongs to vehicle type A is a surrounding situation detected by travel-situation detector 1201. A processor of vehicle 1200*x* of vehicle type X generates the above second travel history that includes a travel situation of vehicle 1200*x* that belongs to vehicle type X. The travel situation of vehicle 1200*x* that belongs to vehicle type X is a surrounding situation detected by travel-situation detector 1201.

Consequently, the first travel history and the second travel history are generated. The first travel history and the second travel history each include a travel situation that is a situation related to objects around vehicle 1200, and other vehicles that travel around vehicle 1200, for example. The objects around vehicle 1200 include a white line on a road, or obstacles, for example. The other vehicles include a vehicle that travels in front of vehicle 1200, for example. Therefore, driver models that each reflect situations around vehicle 1200 are built. That is, a vehicle-type-A driver model and a vehicle-type-X driver model are built.

Further, a format of parameters that represent surrounding situations detected by travel-situation detector 1201 of vehicle type A may be different from a format of parameters that represent surrounding situations detected by travel-situation detector 1201 of vehicle type X. In that case, the processor of vehicle 1200*a* of vehicle type A and the processor of vehicle 1200*x* of vehicle type X convert a format of parameters of at least one of vehicle type A and vehicle type X. Consequently, a first travel history and a second travel history are generated, the first travel history and the second travel history each including a travel situation that is represented in a unified format.

Consequently, even if a format of parameters that represent situations around vehicle 1200*a* that belongs to vehicle type A detected around vehicle 1200*a* that belongs to vehicle type A is different from a format of parameters that represent situations around vehicle 1200*x* that belongs to vehicle type X detected around vehicle 1200*x* that belongs to vehicle type X, a format of a first travel history and a format of a second travel history are unified. Therefore, the first travel history and the second travel history whose formats are unified facilitate transfer learning from a vehicle-type-A driver model to a vehicle-type-X driver model.

Forecasting part 1207 of vehicle type X forecasts a behavior of vehicle 1200*x* that belongs to vehicle type X. The forecast behavior is a behavior related to parameters that represent a surrounding situation detected by travel-situation detector 1201 of vehicle type X in the vehicle-type-X driver model.

Consequently, an appropriate behavior of vehicles 1200*x* that belong to vehicle type X, such as a luxury vehicle, is forecast.

Figure 4:
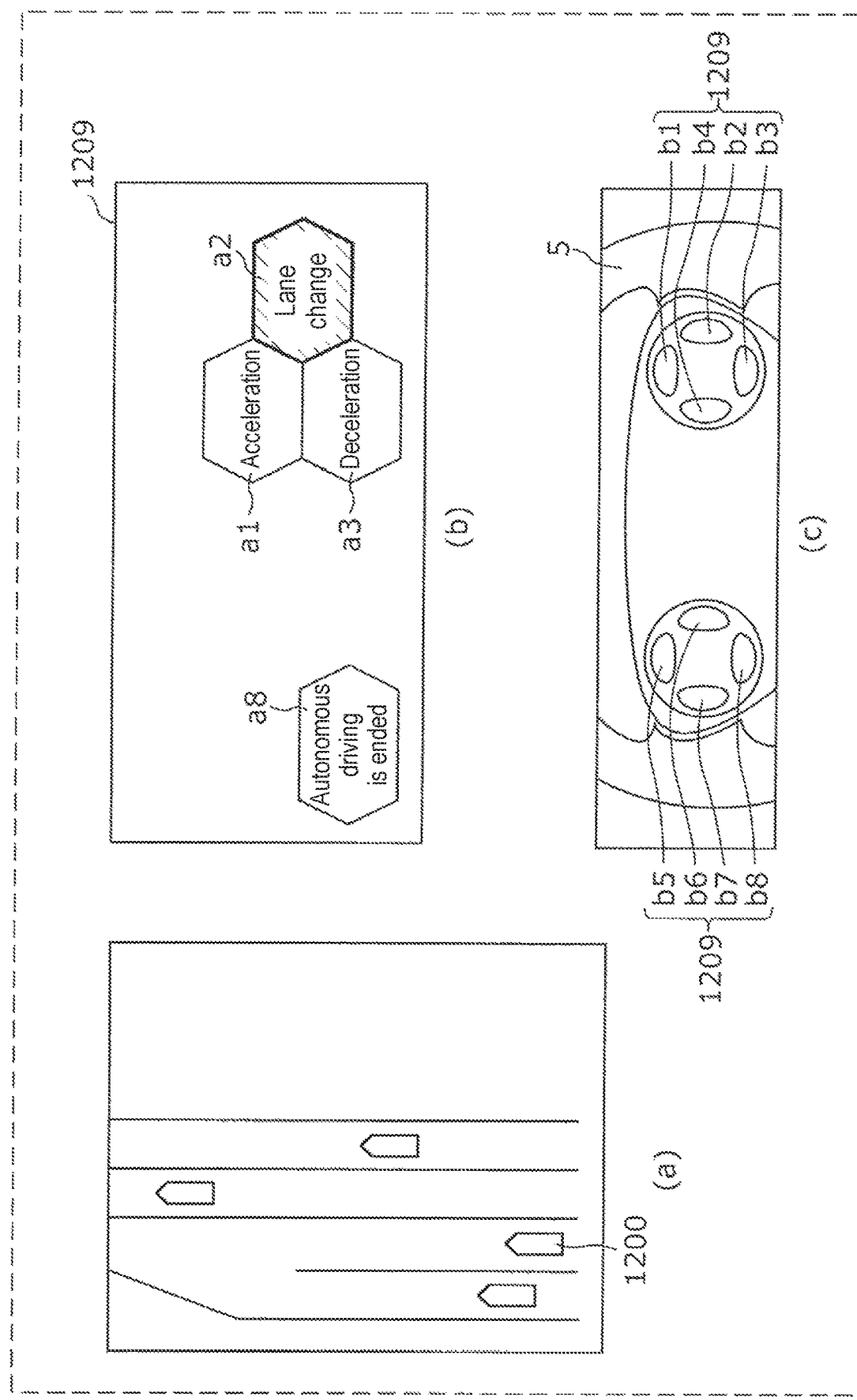
FIG. 4 illustrates a travel situation, and display and operation of an interface that correspond to the travel situation according to the exemplary embodiment.

FIG. 4 illustrates a travel situation, and display and operation of interface 1209 that correspond to the travel situation.

For example, vehicle 1200 travels in a travel situation illustrated in part (a) of FIG. 4. Specifically, in the travel situation illustrated in part (a) of FIG. 4, there are merging lanes in front of a lane in which vehicle 1200 is traveling, there is a vehicle that is merging from left of the lane, and vehicle 1200 can change lanes to right of the lane in which vehicle 1200 is traveling.

Travel-situation detector 1201 detects the travel situation illustrated in part (a) of FIG. 4. The travel situation is represented by a plurality of parameters.

In the travel situation illustrated in part (a) of FIG. 4, interface 1209 displays icon a2 that displays a forecast behavior, icons a1 and a3 that display other behaviors, and icon a8 used for switch to manually controlled driving, on a monitor, as illustrated in part (b) of FIG. 4.

Among icons a1 to a3 and a8, the forecast behavior is "lane change" displayed by icon a2 that is emphasized. Other behaviors are "acceleration" displayed by icon a1 and "deceleration" displayed by icon a3. Further, icon a8 displays "autonomous driving is ended" that represents switch to manually controlled driving.

Interface 1209 includes operating parts. The operating parts are a plurality of operation buttons b1 to b8 attached to steering wheel 5, as illustrated in part (c) of FIG. 4. A number, a shape, or the like of the operating parts attached to steering wheel 5 is not limited to operation buttons b1 to b8.

In the present exemplary embodiment, icons a1 to a3 in part (b) of FIG. 4 correspond to operation buttons b1 to b3 in part (c) of FIG. 4, respectively. Icon a8 in part (b) of FIG. 4 corresponds to operation button b8 in part (c) of FIG. 4.

In this configuration, when a driver accepts the forecast behavior, the driver does not press operation buttons b1 to b8. In that case, vehicle controlling part 1210 causes vehicle 1200 to perform the forecast behavior. Alternatively, when the driver does not accept the forecast behavior, the driver presses one of the operation buttons that corresponds to one of icons a1 and a3 that displays a behavior the driver wants. For example, when the driver wants "acceleration", the driver presses operation button b1 that corresponds to icon a1. Consequently, vehicle controlling part 1210 causes vehicle 1200 to perform the behavior displayed by the icon that corresponds to the pressed operation button. In the above case, vehicle controlling part 1210 causes vehicle 1200 to perform "acceleration".

Although only characters are displayed by icons a1 to a3 and a8 in part (b) of FIG. 4, symbols related to drive of vehicle 1200 may be displayed.

Process operation of learning part 1104, transfer-learning part 1105, and forecasting part 1207 will be described in detail.

In the present exemplary embodiment, a neural network (NN) is used as a driver model.

Figure 5:
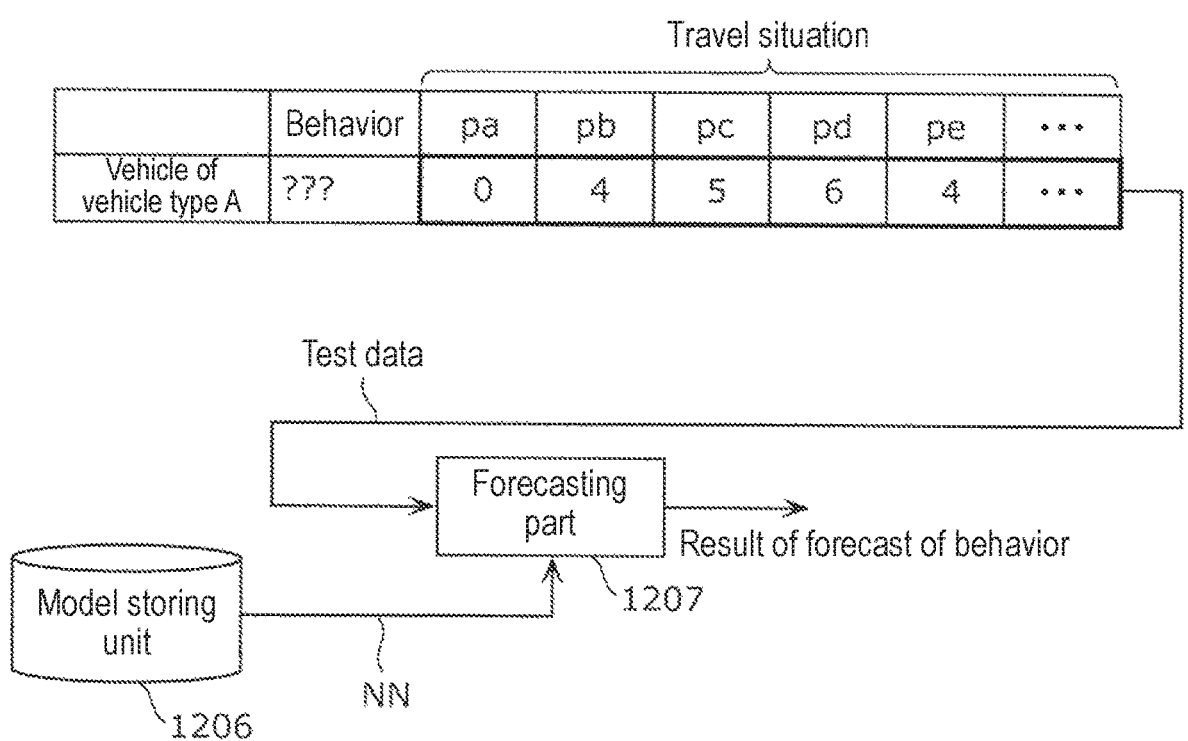
FIG. 5 illustrates an example of forecast of a behavior by a forecasting part according to the exemplary embodiment.

FIG. 5 illustrates an example of forecast of a behavior by forecasting part 1207 according to the present exemplary embodiment.

Forecasting part 1207 of vehicle type A reads a neural network stored in model storing unit 1206. Then forecasting part 1207 inputs test data that is a current travel situation detected by travel-situation detector 1201 of vehicle type A to the neural network. Consequently, forecasting part 1207 outputs a result of forecast of a behavior that is a behavior that corresponds to the travel situation. In an example illustrated in FIG. 5, a travel situation includes parameters pa, pb, pc, pd, and pe, for example. Consequently, forecasting part 1207 forecasts a behavior to be selected by vehicle 1200a of vehicle type A after a predetermined period of time from a current time.

Figure 6:
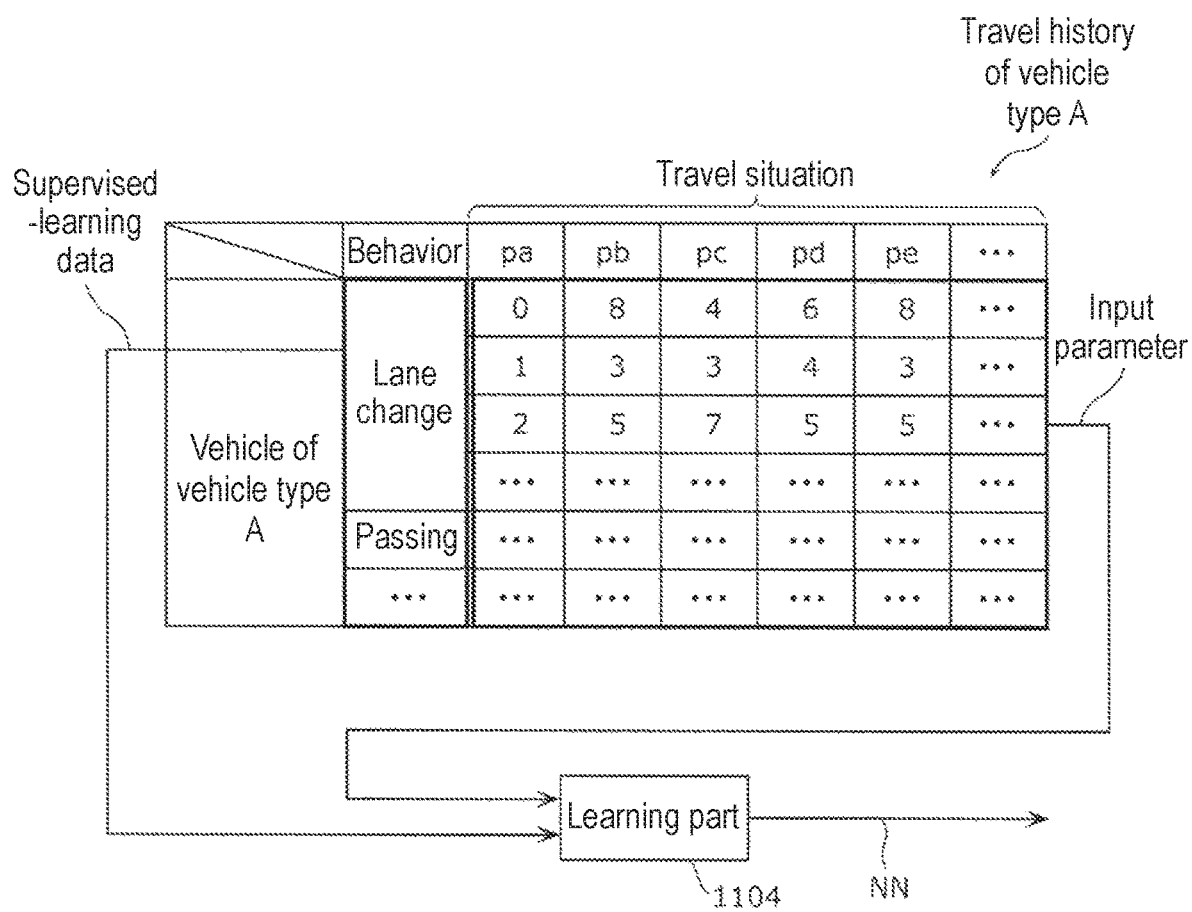
FIG. 6 illustrates an example of learning by a learning part according to the exemplary embodiment.

FIG. 6 illustrates an example of learning by learning part 1104.

Learning part 1104 obtains a travel situation included in a travel history of vehicle type A stored in history-of-vehicle-type-A storing unit 1102. The obtained travel situation is input parameters. In an example illustrated in FIG. 6, the travel situation includes parameters pa, pb, pc, pd, and pe, for example. Further, learning part 1104 obtains a behavior that is included in the travel history and is related to the travel situation. The behavior is supervised-learning data. Then learning part 1104 adjusts the neural network, based on the input parameters and the supervised-learning data. That is, learning part 1104 adjusts weight parameters and the like of the neural network. Consequently, the neural network to which input parameters are input outputs supervised-learning data. As a result of the adjustment, learning part 1104 causes the neural network to learn relation between the input parameters and the supervised-learning data. Consequently, a vehicle-type-A neural network (i.e. driver model) is built.

Figure 7A:
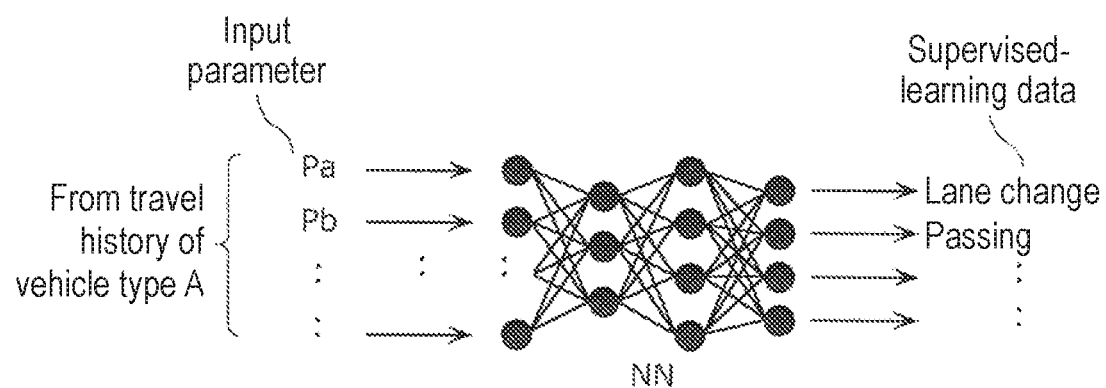
FIG. 7A illustrates an example of learning of a neural network according to the exemplary embodiment.

FIG. 7A illustrates an example of learning of a neural network.

Learning part 1104 inputs a plurality of input parameters, such as parameters pa and pb, to a neural network. The input parameters are represented as a travel situation in a travel history of vehicle type A. Then learning part 1104 optimizes weight parameters of the neural network. Consequently, output from the neural network corresponds to supervised-learning data related to the input parameters in the travel history. Consequently, a vehicle-type-A neural network is built.

Figure 7B:
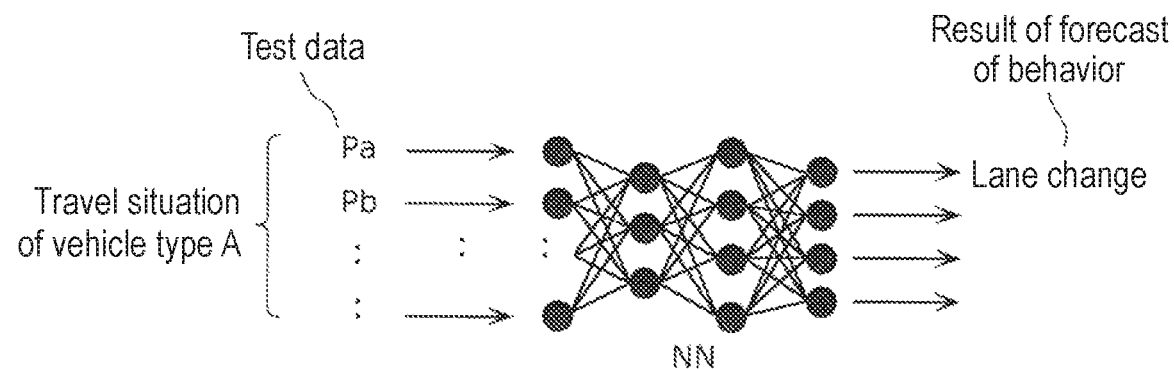
FIG. 7B illustrates an example of forecast of a behavior with a vehicle-type-A neural network according to the exemplary embodiment.

FIG. 7B illustrates an example of forecast of a behavior with a vehicle-type-A neural network.

Forecasting part 1207 of vehicle type A obtains test data that is a travel situation detected by travel-situation detector 1201 of vehicle type A, and inputs the test data to a vehicle-type-A neural network. Parameters pa, pb, and the like included in the test data are relative speeds and distances of other vehicles that is travelling around vehicle 1200a, for example. Parameters pa, pb, and the like correspond to parameters that represent a travel situation included in a travel history and are used as the above input parameters. Consequently, forecasting part 1207 of vehicle type A receives a result of forecast of a behavior output from the vehicle-type-A neural network. For example, the result of forecast of a behavior is a behavior that represents lane change.

Figure 8:
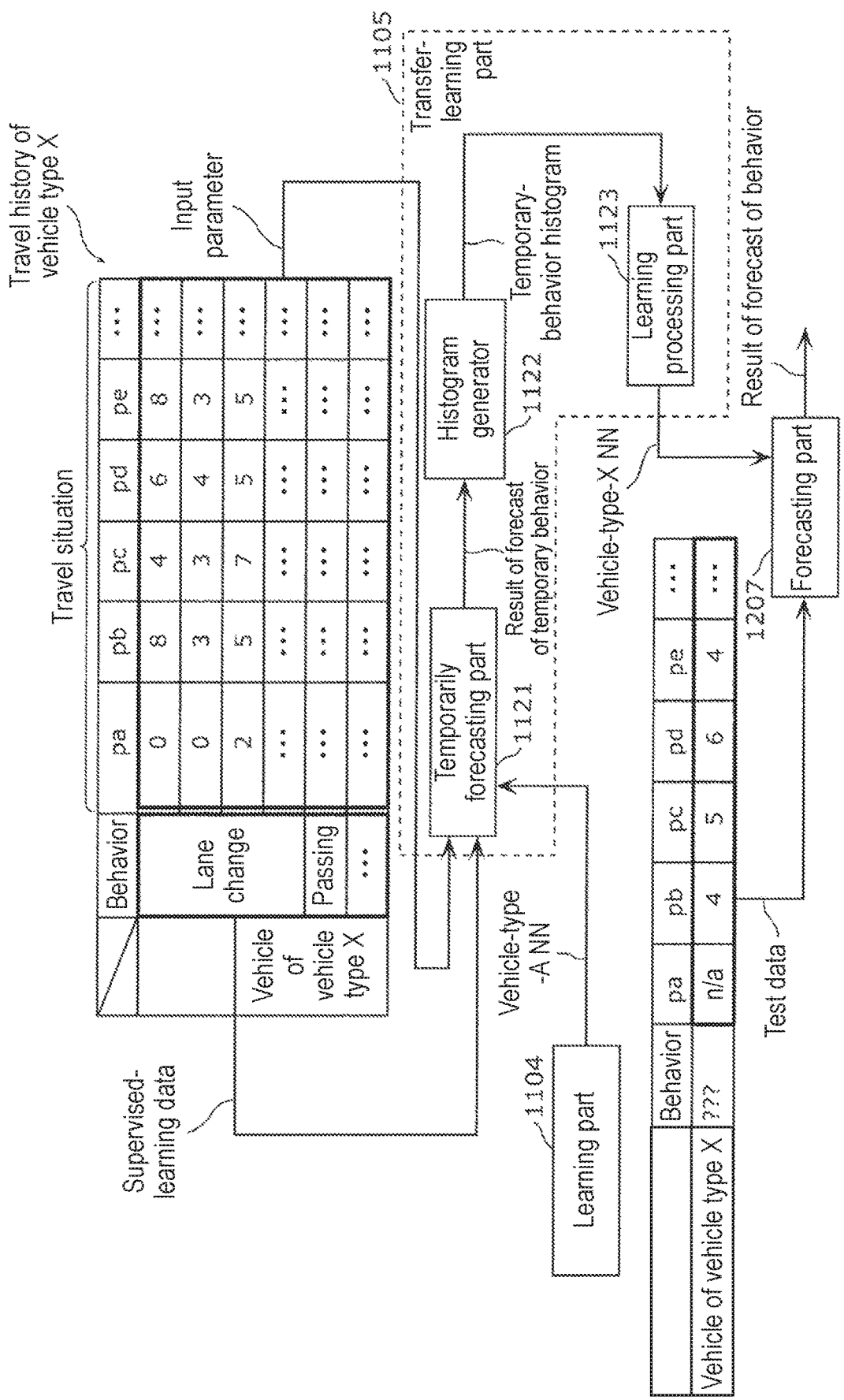
FIG. 8 illustrates an example of transfer learning by a transfer-learning part according to the exemplary embodiment.

FIG. 8 illustrates an example of transfer learning by transfer-learning part 1105.

First the vehicle-type-A neural network is built by learning part 1104, as described above. Next, transfer-learning part 1105 builds a vehicle-type-X neural network by transfer learning. In the transfer learning, the vehicle-type-A neural network is retrained with a travel history of vehicle type X stored in history-of-vehicle-type-X storing unit 1103.

Transfer-learning part 1105 includes temporarily forecasting part 1121, histogram generator 1122, and learning processing part 1123.

Temporarily forecasting part 1121 obtains a behavior included in a travel history of vehicle type X stored in history-of-vehicle-type-X storing unit 1103. The behavior is supervised-learning data. Further, temporarily forecasting part 1121 obtains a travel situation that is included in the travel history of vehicle type X and is related to the behavior. The travel situation is input parameters. Temporarily forecasting part 1121 inputs the input parameters to the vehicle-type-A neural network, and the vehicle-type-A neural network outputs a temporary behavior. Temporarily forecasting part 1121 outputs the temporary behavior as a result of forecast of a temporary behavior to histogram generator 1122. Temporarily forecasting part 1121 outputs the supervised-learning data to histogram generator 1122.

Histogram generator 1122 receives the behavior of the supervised-learning data, and the result of forecast of a temporary behavior that corresponds to the behavior of the supervised-learning data. Histogram generator 1122 generates a temporary-behavior histogram that represents a cumulative value of the result of forecast of a temporary behavior relative to the behavior of the supervised-learning data.

Learning processing part 1123 relearns weight parameters of the vehicle-type-A neural network. Consequently, correspondence between output of the vehicle-type-A neural network and the supervised-learning data increases, based on the temporary-behavior histogram. That is, the weight parameters of the vehicle-type-A neural network are adjusted again. Consequently, a vehicle-type-X neural network is built.

Forecasting part 1207 of vehicle type X uses the vehicle-type-X neural network to forecast a behavior of vehicle 1200x of vehicle type X. That is, similarly as forecasting part 1207 of vehicle type A, forecasting part 1207 of vehicle type X receives test data that is a travel situation detected by travel-situation detector 1201 of vehicle type X, and inputs the test data to the vehicle-type-X neural network. Consequently, forecasting part 1207 of vehicle type X obtains a result of forecast of a behavior. The result of forecast of a behavior is a behavior output from the vehicle-type-X neural network. Then forecasting part 1207 outputs the result of forecast of a behavior. Consequently, a behavior of vehicle 1200x of vehicle type X is forecast.

FIG. 9 illustrates an example of forecast of a temporary behavior with a vehicle-type-A neural network.

Temporarily forecasting part 1121 forecasts a temporary behavior by using the vehicle-type-A neural network built by learning part 1104. That is, temporarily forecasting part 1121 obtains a particular behavior (e.g. lane change) included in the travel history of vehicle type X stored in history-of-vehicle-type-X storing unit 1103. The particular behavior is supervised-learning data. Further, temporarily forecasting part 1121 obtains a travel situation related to the behavior in the travel history of vehicle type X. The travel situation is input parameters. When the travel history of vehicle type X includes a plurality of travel situations related to the particular behavior, temporarily forecasting part 1121 obtains the plurality of travel situations as input parameters.

Then temporarily forecasting part 1121 inputs the input parameters to the vehicle-type-A neural network. Consequently, temporarily forecasting part 1121 obtains temporary behaviors (or results of forecast of temporary behaviors). The temporary behaviors (or results of forecast of temporary behaviors) are relative to supervised-learning data that is a particular behavior (e.g. lane change), include passing, for example, in addition to lane change, and are results of forecast that are different from each other.

Histogram generator 1122 generates a histogram of the results of forecast of temporary behaviors (i.e. a temporary-behavior histogram). The results of forecast of temporary behaviors are relative to the supervised-learning data that is the particular behavior (e.g. lane change). The temporary-behavior histogram represents a cumulative value of the results of forecast of temporary behaviors. The results of forecast of temporary behaviors are obtained as output from the vehicle-type-A neural network.

FIG. 10 illustrates an example of a method of building a vehicle-type-X neural network.

After a temporary-behavior histogram illustrated in part (a) of FIG. 10 is generated, learning processing part 1123 relearns weight parameters of a vehicle-type-A neural network. Consequently, correspondence between output of the vehicle-type-A neural network and supervised-learning data (lane change in the example) increases. Consequently, learning processing part 1123 builds a vehicle-type-X neural network that outputs only a behavior of supervised-learning data (e.g. lane change) as a result of forecast, as illustrated in part (b) of FIG. 10. Such relearning is performed for each of a plurality of other pieces of supervised-learning data, in addition to one piece of supervised-learning data. That is, learning processing part 1123 builds a vehicle-type-X neural network by transfer learning.

FIG. 11 illustrates an example of a travel history.

In the above example, the travel history includes a plurality of parameters pa, pb, bc, and the like that represent a travel situation. Specifically, the parameters pa, pb, bc, and the like may be parameters illustrated in FIG. 11. That is, a plurality of parameters that represent a travel situation may include a parameter that represents a situation of an own vehicle, a parameter that represents a situation of a vehicle in front of the own vehicle, a parameter that represents a situation of a vehicle to left or right of the own vehicle, a parameter that represents a situation of merging lanes, and parameters that represent a situation related to a position of the own vehicle.

The parameter that represents a situation of the own vehicle is speed Va of the own vehicle. The parameter that represents a situation of a vehicle in front of the own vehicle includes relative speed Vba of the vehicle in front of the own vehicle relative to the own vehicle, distance DRba between the vehicle in front of the own vehicle and the own vehicle, and variation rate RSb. Variation rate RSb is calculated from RSb=−Vba/DRba.

The parameter that represents a situation of a vehicle to left or right of the own vehicle includes relative speed Vca of a vehicle to rear left or rear right of the own vehicle relative to the own vehicle, distance Dca between a front end of a vehicle to rear left or rear right of the own vehicle and a front end of the own vehicle, and variation rate Rca. Further, the parameter that represents a situation of a vehicle to left or right of the own vehicle includes relative speed Vda of a vehicle to front left or front right of the own vehicle relative to the own vehicle, distance Dda between a front end of a vehicle to front left or front right of the own vehicle and a front end of the own vehicle, and variation rate Rda. Further, the parameter that represents a situation of a vehicle to left or right of the own vehicle includes remaining distance DRda of an adjacent lane. Variation rate Rca is calculated from Vca/Dca. Variation rate Rda is calculated from Vda/Dda. Remaining distance DRda of an adjacent lane is a parameter that represents a degree of possibility of lane change to an adjacent lane.

The parameter that represents a situation of merging lanes includes relative speed Vma of a merging vehicle relative to the own vehicle, distance Dma between a front end of a merging vehicle and a front end of the own vehicle, and variation rate Rma of the distance between a front end of a merging vehicle and a front end of the own vehicle. Distance Dma between a front end of a merging vehicle and a front end of the own vehicle is a distance between a front end of the own vehicle and a front end of a merging vehicle measured in a direction along a travel direction of the own vehicle (and the merging vehicle). Variation rate Rma of the distance between a front end of a merging vehicle and a front end of the own vehicle is calculated from Rma=Vma/Dma.

The parameters that represent a situation related to a position of the own vehicle include a parameter that represents a lane that the own vehicle is travelling, and a parameter that represents a distance between the own vehicle and a merging point.

A travel history illustrated in FIG. 11 is an example. A travel history is not limited to the travel history illustrated in FIG. 11.

Figure 12:
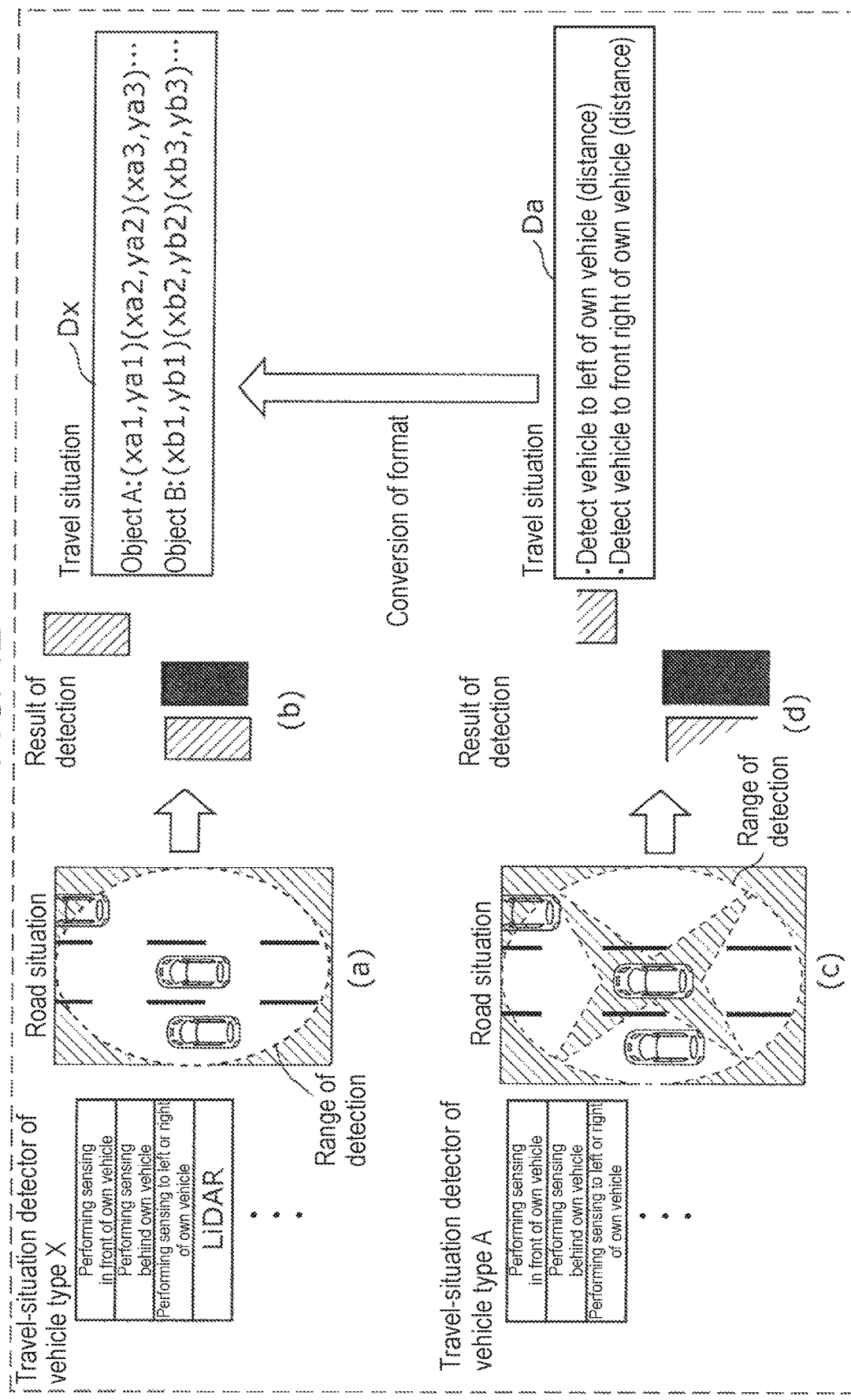
FIG. 12 illustrates an example of a process of a format processing part according to the exemplary embodiment.

FIG. 12 illustrates an example of a process of format processing part 1202.

For example, travel-situation detector 1201 of vehicle 1200x of vehicle type X performs sensing in front of vehicle

1200x, behind vehicle 1200x, and to left or right of vehicle 1200x. Light detection and ranging (LiDAR) is used in travel-situation detector 1201 of vehicle 1200x to perform the sensing. Therefore, travel-situation detector 1201 of vehicle 1200x accurately detects a surrounding situation. For example, travel-situation detector 1201 detects a travel situation (i.e. a road situation) all around vehicle 1200x, as illustrated in part (a) of FIG. 12. When another vehicle travels to left of vehicle 1200x and another vehicle travels to front right of vehicle 1200x, as illustrated in part (a) of FIG. 12, travel-situation detector 1201 accurately detects positions of the other vehicles, as illustrated in part (b) of FIG. 12. That is, in that case, travel-situation detector 1201 detects travel situation Dx. Travel situation Dx represents coordinates of a plurality of features of the other vehicles (objects A and B) described above. The coordinates are parameters. The plurality of features are corners of object A or B, for example. Coordinates of the plurality of features are represented by a coordinate system in which an origin is a position of vehicle 1200x that is an own vehicle.

On the other hand, travel-situation detector 1201 of vehicle 1200a of vehicle type A performs sensing in front of vehicle 1200a, behind vehicle 1200a, and to left or right of vehicle 1200a, similarly as vehicle type X. Travel-situation detector 1201 of vehicle 1200a performs sensing with a camera that includes stereo lenses, for example. Therefore, travel-situation detector 1201 of vehicle 1200a less accurately detects a surrounding situation than travel-situation detector 1201 of vehicle type X detects. For example, travel-situation detector 1201 of vehicle type A detects a travel situation (i.e. a road situation) partially around vehicle 1200a, as illustrated in part (c) of FIG. 12. When another vehicle travels to left of vehicle 1200a and another vehicle travels to front right of vehicle 1200a, as illustrated in part (c) of FIG. 12, travel-situation detector 1201 detects positions of the other vehicles, as illustrated in part (d) of FIG. 12. That is, in that case, travel-situation detector 1201 detects travel situation Da. Travel situation Da is information that includes a parameter that represents detection of another vehicle to left of vehicle 1200a and a distance from vehicle 1200a to another vehicle, and a parameter that represents detection of another vehicle to front right of vehicle 1200a and a distance from vehicle 1200a to another vehicle.

That is, a format of parameters that represent travel situation Dx detected by travel-situation detector 1201 of vehicle type X may be different from a format of parameters that represent travel situation Da detected by travel-situation detector 1201 of vehicle type A.

In that case, format processing part 1202 according to the present exemplary embodiment unifies the formats. For example, format processing part 1202 of vehicle type A converts a format of a travel situation detected by travel-situation detector 1201 of vehicle type A into a format of vehicle type X. Specifically, format processing part 1202 of vehicle type A uses a distance from vehicle 1200a to another vehicle to left of vehicle 1200a to generate coordinates of features of another vehicle. Travel situation Da represents the distance from vehicle 1200a to another vehicle to left of vehicle 1200a. Further, format processing part 1202 of vehicle type A uses a distance from vehicle 1200a to another vehicle to front right of vehicle 1200a to generate coordinates of features of another vehicle. Travel situation Da represents the distance from vehicle 1200a to another vehicle to front right of vehicle 1200a. For example, format processing part 1202 generates coordinates of features of another vehicle, based on a distance between vehicle 1200a and another vehicle and a direction from vehicle 1200a to another vehicle represented by travel situation Da, and a size and a shape of another vehicle that are predetermined. Format processing part 1202 converts parameters of travel situation Da into coordinates of features generated in this way to allow a format of travel situation Da to correspond to a format of travel situation Dx.

Figure 13:
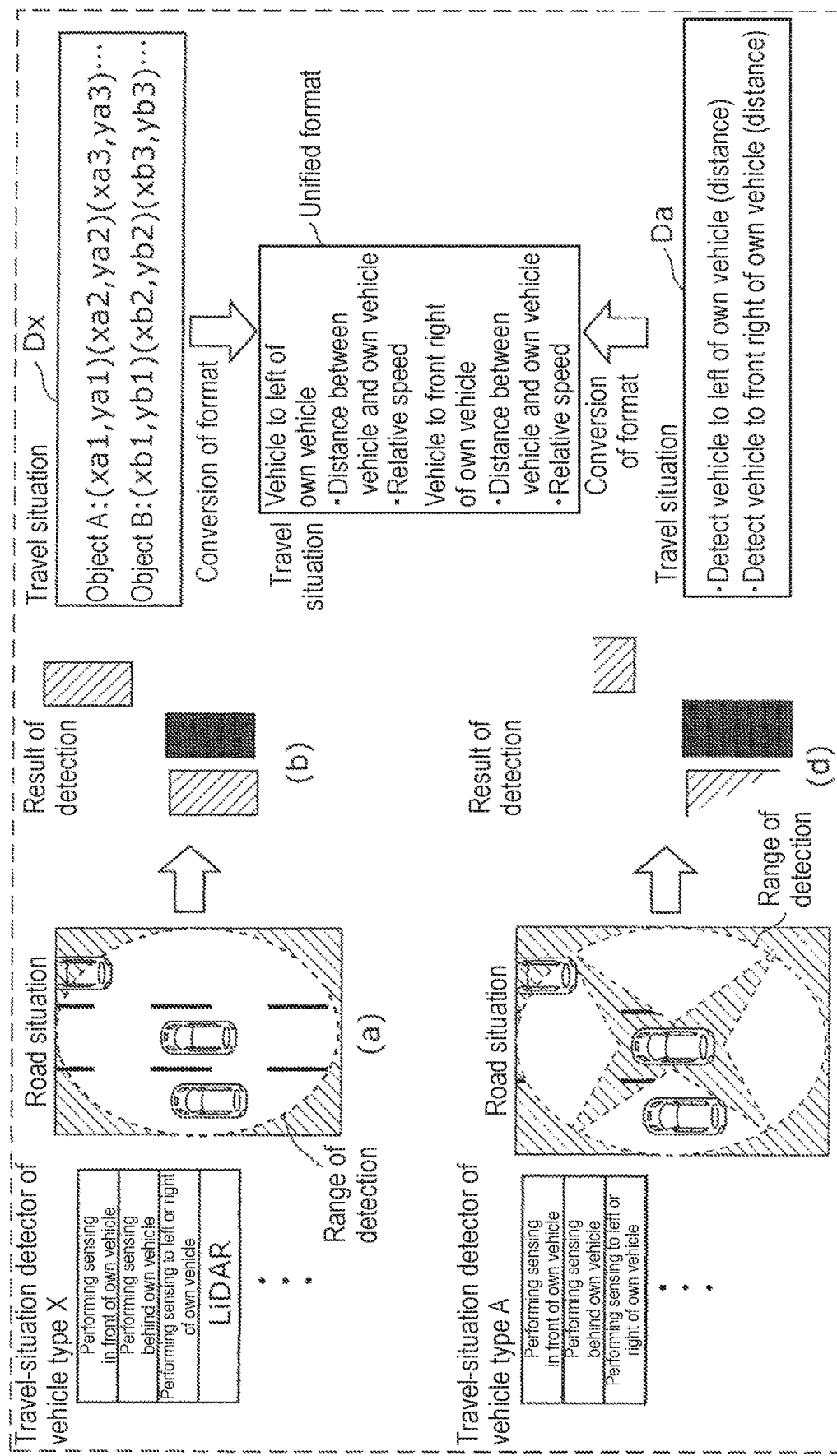
FIG. 13 illustrates another example of a process of a format processing part according to the exemplary embodiment.

FIG. 13 illustrates another example of a process of format processing part 1202.

Similarly as the example illustrated in FIG. 12, a format of parameters that represent a travel situation detected by travel-situation detector 1201 of vehicle type X may be different from a format of parameters that represent a travel situation detected by travel-situation detector 1201 of vehicle type A.

In that case, format processing part 1202 of vehicle type A and format processing part 1202 of vehicle type X convert formats of travel situations detected by travel-situation detectors 1201 into a predetermined format. In other words, a processor of vehicle type A converts a format of parameters of travel-situation detector 1201 of vehicle type A (first detector) into the predetermined format. Further, a processor of vehicle type X converts a format of parameters of travel-situation detector 1201 of vehicle type X (second detector) into the predetermined format. That is, format processing part 1202 of vehicle type A converts a format of travel situation Da detected by travel-situation detector 1201 of vehicle type A into a unified format that is predetermined, as illustrated in FIG. 13. Similarly, format processing part 1202 of vehicle type X converts a format of travel situation Dx detected by travel-situation detector 1201 of vehicle type X into the unified format that is predetermined, as illustrated in FIG. 13.

A travel situation of the unified format represents, as parameters, a distance between a vehicle around an own vehicle and the own vehicle, and a relative speed of a vehicle around the own vehicle relative to the own vehicle, for example. For example, a distance between a vehicle around an own vehicle and the own vehicle is a distance between the own vehicle and a center of gravity of a plurality of features of an object represented by travel situation Dx. A relative speed is calculated based on a temporal variation of a distance between a position of an own vehicle and a center of gravity of a plurality of features of an object represented by travel situation Dx. Alternatively, a relative speed is calculated based on a temporal variation of a distance represented by travel situation Da.

In this way, a format of a travel history of vehicle type A (first travel history) and a format of a travel history of vehicle type X (second travel history) are unified in the present exemplary embodiment even if a format of parameters that represent a situation around vehicle 1200a that belongs to vehicle type A detected around vehicle 1200a that belongs to vehicle type A is different from a format of parameters that represent a situation around vehicle 1200x that belongs to vehicle type X detected around vehicle 1200x that belongs to vehicle type X. Therefore, the travel history of vehicle type A and the travel history of vehicle type X whose formats are unified facilitate transfer learning from a vehicle-type-A driver model to a vehicle-type-X driver model.

Figure 14:
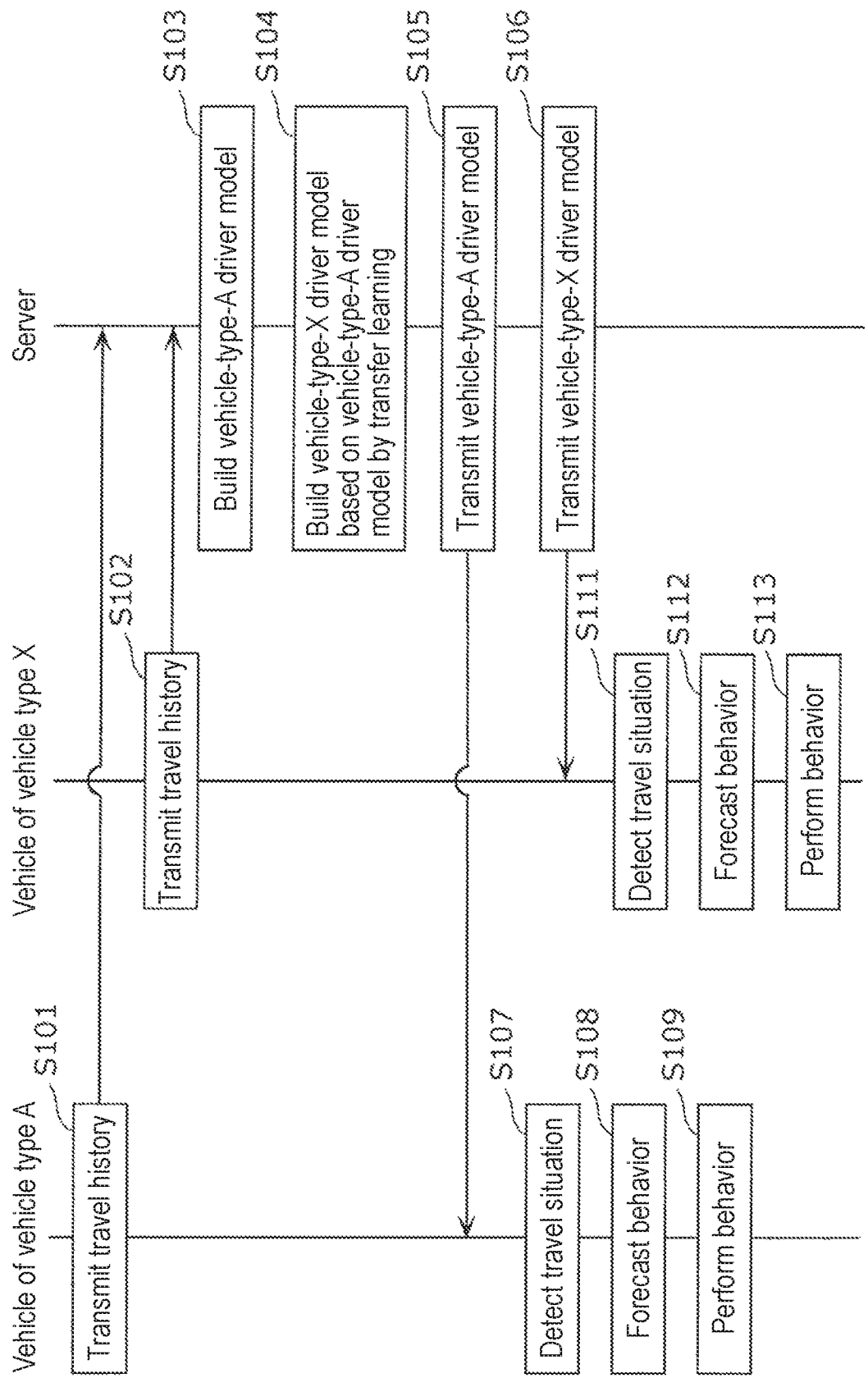
FIG. 14 is a sequence diagram that illustrates process operation of an information processing system according to the exemplary embodiment.

FIG. 14 is a sequence diagram that illustrates process operation of information processing system 1000 according to the present exemplary embodiment.

First, vehicle 1200a of vehicle type A and vehicle 1200x of vehicle type X each transmit a travel history to server 1100 (steps S101, S102).

Server 1100 builds a vehicle-type-A driver model based on the travel history of vehicle type A (step S103). Then server 1100 builds a vehicle-type-X driver model based on the vehicle-type-A driver model by transfer learning in which the travel history of vehicle type X is used (step S104). Further, server 1100 transmits the vehicle-type-A driver model to vehicle 1200a of vehicle type A (step S105), and transmits the vehicle-type-X driver model to vehicle 1200x of vehicle type X (step S106).

Vehicle 1200a of vehicle type A detects a travel situation (step S107). Next, vehicle 1200a of vehicle type A forecasts a behavior of vehicle 1200a of vehicle type A (step S108). The forecast behavior is a behavior related to the detected travel situation in the vehicle-type-A driver model transmitted from server 1100. Then vehicle 1200a of vehicle type A displays the forecast behavior to a driver, or performs the forecast behavior (step S109).

Similarly, vehicle 1200x of vehicle type X detects a travel situation (step S111). Next, vehicle 1200x of vehicle type X forecasts a behavior of vehicle 1200x of vehicle type X (step S112). The forecast behavior is a behavior related to the detected travel situation in the vehicle-type-X driver model transmitted from server 1100. Then vehicle 1200x of vehicle type X displays the forecast behavior to a driver, or performs the forecast behavior (step S113).

For example, a processor of vehicle 1200a performs the steps of vehicle 1200a of vehicle type A described above. Similarly, a processor of vehicle 1200x performs the steps of vehicle 1200x of vehicle type X described above. Similarly, a processor of server 1100 performs the steps of server 1100 described above.

As described above, information processing system 1000 according to the present exemplary embodiment includes first processors of vehicles 1200a that belong to vehicle type A, second processors of vehicles 1200x that belong to vehicle type X, and a third processor of server 1100. Each of the first processors transmits a first travel history to server 1100. The first travel history is generated by travel of vehicle 1200a that belongs to vehicle type A. Each of the second processors transmits a second travel history to server 1100. The second travel history is generated by travel of vehicle 1200x that belongs to vehicle type X. The third processor receives the first travel histories from vehicles 1200a that belong to vehicle type A, and receives the second travel histories from vehicles 1200x that belong to vehicle type X. Next, the third processor transmits a built vehicle-type-X driver model to the second processors.

Consequently, learning and transfer learning whose processes are relatively heavy loads are performed by server 1100. Therefore, processes performed by vehicles 1200a and vehicles 1200x become lighter loads.

Advantageous Effect

As described above, even if a few travel histories are received from vehicles 1200x that belong to vehicle type X, such as a scarce luxury vehicle, a driver model that is appropriate for vehicle type X is built in the present exemplary embodiment. That is, the vehicle-type-X driver model is built by transfer learning for the vehicle-type-A driver model built with many travel histories received from vehicles 1200a that belong to vehicle type A, such as an abundant regular vehicle. Therefore, even if a number of the vehicles 1200x that belong to vehicle type X is small, the vehicle-type-X driver model is appropriately and easily built. Consequently, the vehicle-type-X driver model is used to forecast a behavior that is appropriate for vehicle 1200x that belongs to vehicle type X.

Modification

In the above exemplary embodiment, only a vehicle-type-A driver model is an original driver model used for transfer learning. However, a driver may select an original driver model used for transfer learning from a plurality of driver models.

Figure 15:
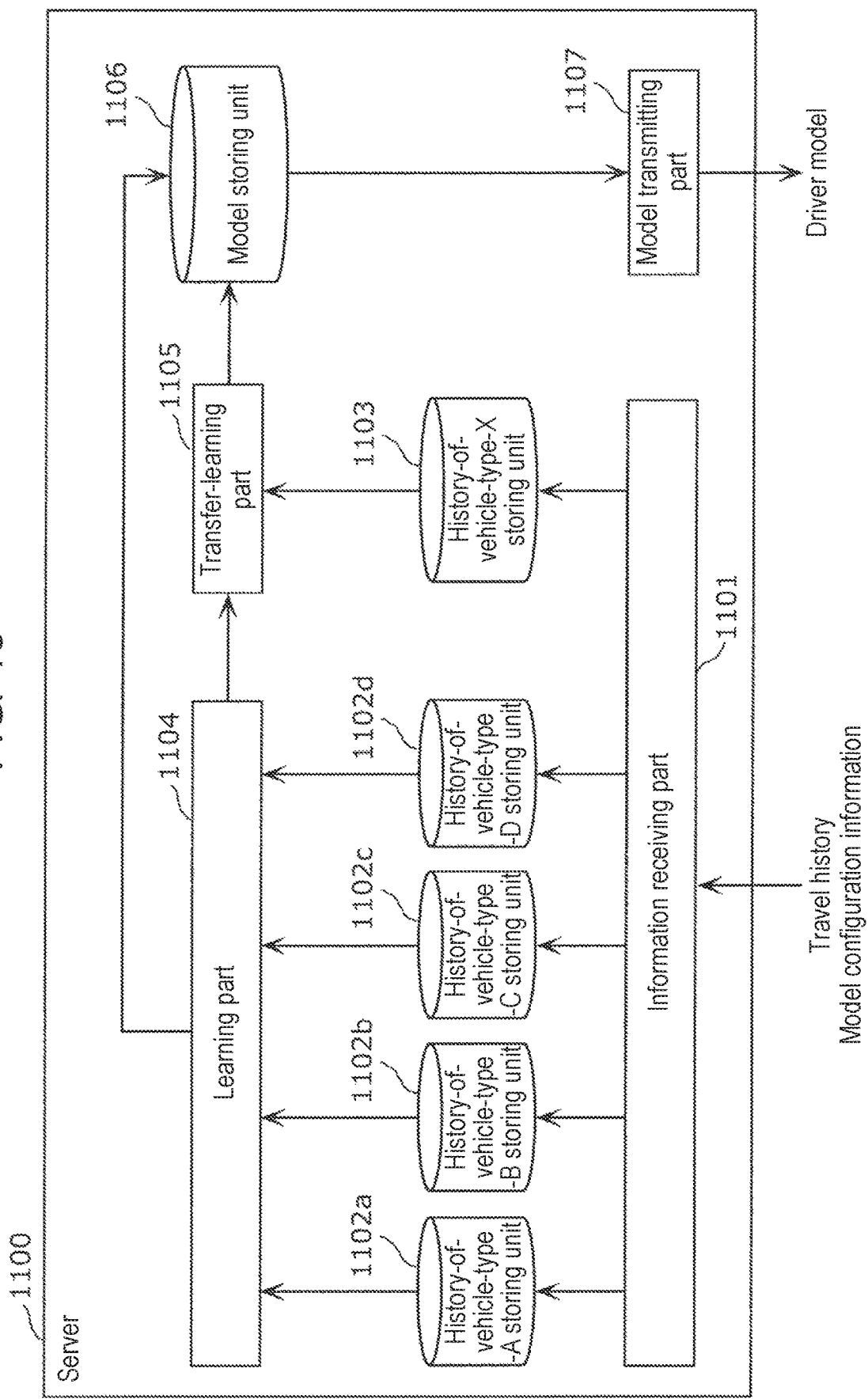
FIG. 15 is a block diagram that illustrates a configuration of functions of a server according to a modification of the exemplary embodiment.

FIG. 15 is a block diagram that illustrates a configuration of functions of server 1100 according to a modification.

Similarly as the above exemplary embodiment, server 1100 according to the present modification includes history-of-vehicle-type-X storing unit 1103, learning part 1104, transfer-learning part 1105, model storing unit 1106, and model transmitting part 1107. Server 1100 according to the present modification also includes history-of-vehicle-type-A storing unit 1102a, history-of-vehicle-type-B storing unit 1102b, history-of-vehicle-type-C storing unit 1102c, and history-of-vehicle-type-D storing unit 1102d. History-of-vehicle-type-A storing unit 1102a is the same as history-of-vehicle-type-A storing unit 1102 in the above exemplary embodiment.

Information receiving part 1101 receives travel histories and model configuration information from vehicles 1200. When vehicles 1200 are vehicle type A, information receiving part 1101 stores travel histories and model configuration information of vehicles 1200 of vehicle type A in history-of-vehicle-type-A storing unit 1102a. Similarly, information receiving part 1101 stores travel histories and model configuration information of vehicles 1200 of vehicle type B in history-of-vehicle-type-B storing unit 1102b. Information receiving part 1101 stores travel histories and model configuration information of vehicles 1200 of vehicle type C in history-of-vehicle-type-C storing unit 1102c. Information receiving part 1101 stores travel histories and model configuration information of vehicles 1200 of vehicle type D in history-of-vehicle-type-D storing unit 1102d.

Learning part 1104 refers to model configuration information stored in history-of-vehicle-type-A storing unit 1102a to build a driver model that includes a configuration represented by the model configuration information. At that time, learning part 1104 builds a vehicle-type-A driver model as a neural network by learning. In the learning, learning part 1104 uses the travel histories of vehicle type A stored in history-of-vehicle-type-A storing unit 1102a. Further, learning part 1104 stores the built vehicle-type-A driver model in model storing unit 1106.

Similarly, learning part 1104 performs learning in which learning part 1104 uses travel histories stored in history-of-vehicle-type-B storing unit 1102b. Further, learning part 1104 performs learning in which learning part 1104 uses travel histories stored in history-of-vehicle-type-C storing unit 1102c. Further, learning part 1104 performs learning in which learning part 1104 uses travel histories stored in history-of-vehicle-type-D storing unit 1102d. Consequently, learning part 1104 builds a vehicle-type-B driver model as a neural network, a vehicle-type-C driver model as a neural network, and a vehicle-type-D driver model as a neural network. Learning part 1104 stores the built vehicle-type-B driver model, the built vehicle-type-C driver model, and the built vehicle-type-D driver model in model storing unit 1106.

Transfer-learning part 1105 receives the vehicle-type-A driver model from learning part 1104. Similarly as the above exemplary embodiment, transfer-learning part 1105 performs transfer learning in which the travel histories in history-of-vehicle-type-X storing unit 1103 are used for the vehicle-type-A driver model. As a result of the transfer learning, transfer-learning part 1105 builds a vehicle-type-X driver model that represents relation between travel histories and behaviors of vehicle 1200x of vehicle type X. Then transfer-learning part 1105 stores the vehicle-type-X driver model built based on the vehicle-type-A driver model in model storing unit 1106. The vehicle-type-X driver model built based on the vehicle-type-A driver model is a vehicle-type-X driver model based on vehicle type A. Similarly, transfer-learning part 1105 builds a vehicle-type-X driver model by performing transfer learning for the vehicle-type-B driver model. Transfer-learning part 1105 stores the built driver model in model storing unit 1106. The built driver model is a vehicle-type-X driver model based on vehicle type B. Similarly, transfer-learning part 1105 builds a vehicle-type-X driver model by performing transfer learning for the vehicle-type-C driver model. Transfer-learning part 1105 stores the built driver model in model storing unit 1106. The built driver model is a vehicle-type-X driver model based on vehicle type C. Similarly, transfer-learning part 1105 builds a vehicle-type-X driver model by performing transfer learning for the vehicle-type-D driver model. Transfer-learning part 1105 stores the built driver model in model storing unit 1106. The built driver model is a vehicle-type-X driver model based on vehicle type D.

When transfer-learning part 1105 receives selection from vehicle 1200, transfer-learning part 1105 may build a vehicle-type-X driver model of a vehicle type that corresponds to the selection. For example, when vehicle type B is selected as the vehicle type, transfer-learning part 1105 builds a vehicle-type-X driver model based on vehicle type B.

Model transmitting part 1107 transmits the vehicle-type-A driver model stored in model storing unit 1106 to vehicles 1200a of vehicle type A. Further, model transmitting part 1107 reads the vehicle-type-X driver model based on vehicle type A, the vehicle-type-X driver model based on vehicle type B, the vehicle-type-X driver model based on vehicle type C, or the vehicle-type-X driver model based on vehicle type D in model storing unit 1106, and transmits the read driver model to vehicle 1200x of vehicle type X.

Figure 16:
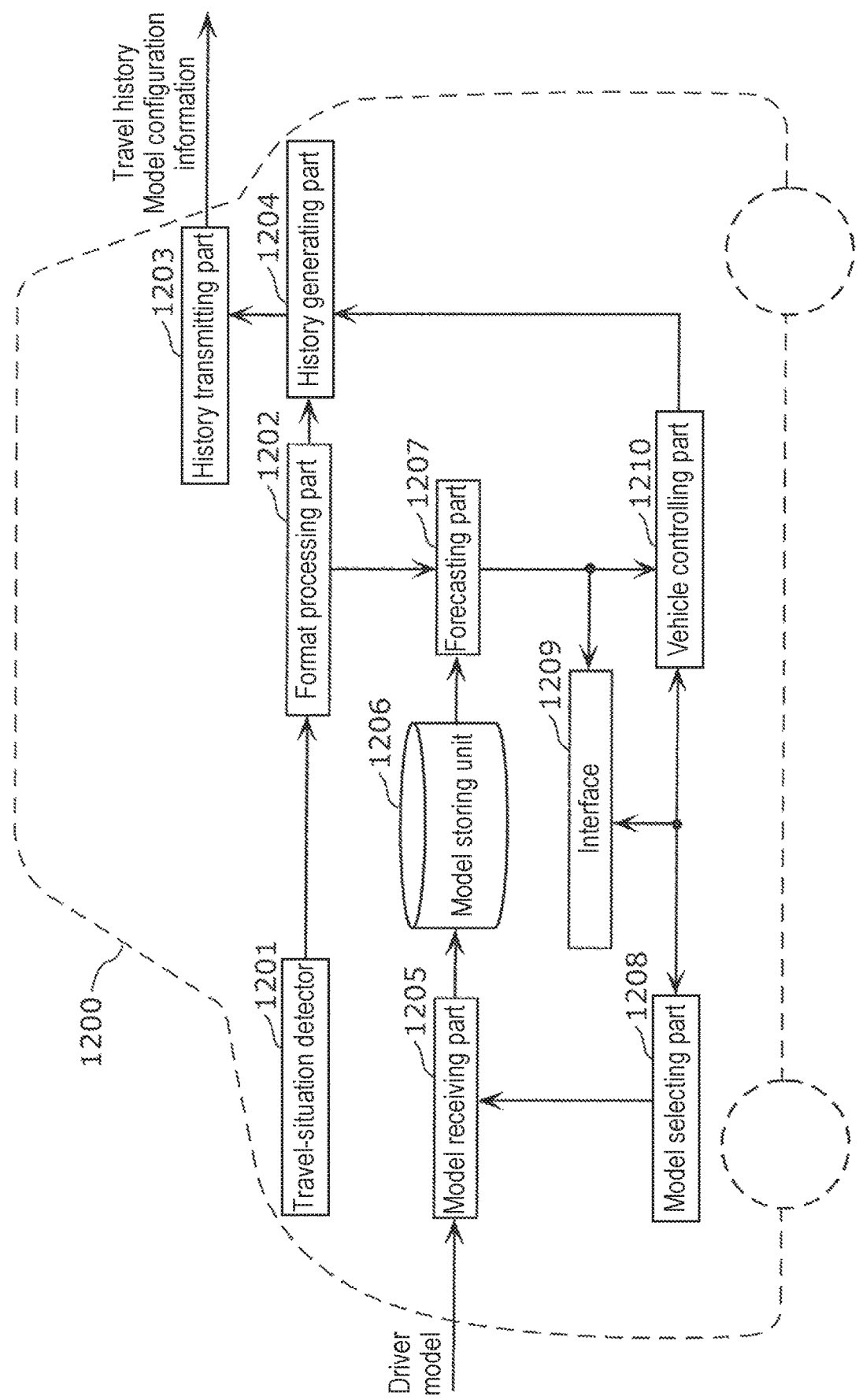
FIG. 16 is a block diagram that illustrates a configuration of functions of a vehicle according to the modification of the exemplary embodiment.

FIG. 16 is a block diagram that illustrates a configuration of functions of vehicle 1200 according to the present modification.

Similarly as the above exemplary embodiment, vehicle 1200 according to the present modification includes travel-situation detector 1201, format processing part 1202, history transmitting part 1203, history generating part 1204, model receiving part 1205, model storing unit 1206, forecasting part 1207, interface 1209, and vehicle controlling part 1210. Vehicle 1200 according to the present modification also includes model selecting part 1208.

Interface 1209 of vehicle 1200x of vehicle type X displays a model-vehicle-type selection display. The model-vehicle-type selection display is used for selection of a vehicle type of a vehicle-type-X driver model. Specifically, the model-vehicle-type selection display is used for selection from a plurality of vehicle types of a vehicle-type-X driver model. That is, one of the vehicle-type-X driver model based on vehicle type A, the vehicle-type-X driver model based on vehicle type B, the vehicle-type-X driver model based on vehicle type C, and the vehicle-type-X driver model based on vehicle type D that are described above is selected.

When interface 1209 is operated by a driver and thus receives one of the vehicle types, interface 1209 notifies model selecting part 1208 of the vehicle type.

When model selecting part 1208 receives notification of the vehicle type of the vehicle-type-X driver model from interface 1209, model selecting part 1208 informs model receiving part 1205 of selection of the vehicle type. When model receiving part 1205 is informed by model selecting part 1208 of selection of the vehicle type, model receiving part 1205 receives a vehicle-type-X driver model of the vehicle type from server 1100.

Figure 17:
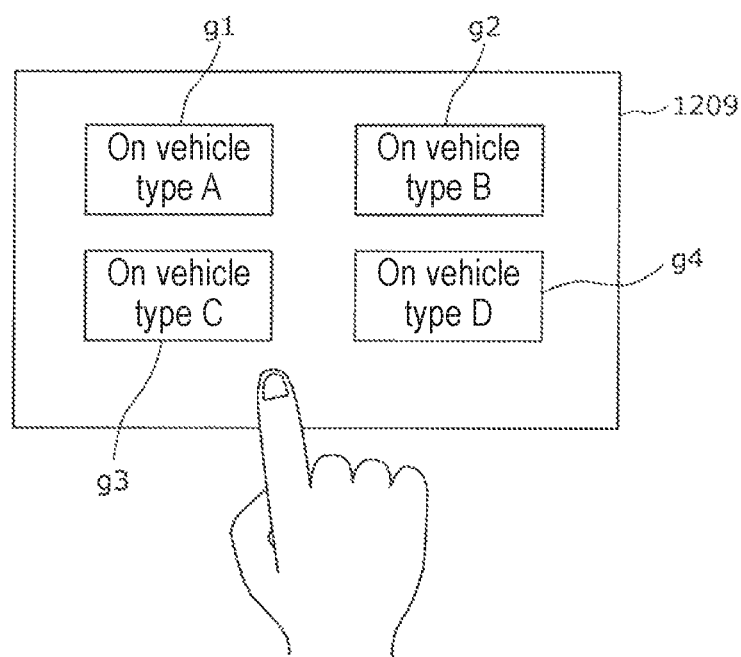
FIG. 17 illustrates an example of a model-vehicle-type selection display displayed by an interface according to the modification of the exemplary embodiment.

FIG. 17 illustrates an example of a model-vehicle-type selection display displayed by interface 1209.

For example, interface 1209 displays a model-vehicle-type selection display displayed in FIG. 17. The model-vehicle-type selection display includes icon g1 that displays a vehicle-type-X driver model based on vehicle type A, icon g2 that displays a vehicle-type-X driver model based on vehicle type B, icon g3 that displays a vehicle-type-X driver model based on vehicle type C, and icon g4 that displays a vehicle-type-X driver model based on vehicle type D.

For example, a driver presses one of the plurality of operation buttons b1 to b8 of interface 1209 illustrated in part (c) of FIG. 4. At that time, interface 1209 displays with emphasis one of icons g1 to g4 of the selection display that corresponds to the pressed operation button. Then interface 1209 notifies model selecting part 1208 of a vehicle type of a vehicle-type-X driver model displayed by the icon.

In this way, a processor of server 1100 according to the present modification also receives third travel histories from each of k (k is an integer that is larger than m) vehicles that belong to vehicle type B (i.e. a third vehicle type). Then the processor learns based on the third travel histories to build a vehicle-type-B driver model that represents relation between travel situations and behaviors of vehicles that belong to vehicle type B (i.e. a third driver model). The processor is informed that the vehicle-type-B driver model is selected from the vehicle-type-A driver model and the vehicle-type-B driver model. In that case, the processor builds a vehicle-type-X driver model by transfer learning in which the second travel histories are used for the vehicle-type-B driver model.

Consequently, one of the vehicle-type-X driver model based on the vehicle-type-B driver model and the vehicle-type-X driver model based on the vehicle-type-A driver model is selected and built. Consequently, the vehicle-type-X driver model based on the vehicle-type-B driver model has travel characteristics similar to travel characteristics of vehicle type B. Therefore, when the vehicle-type-X driver model based on the vehicle-type-B driver model is used, a behavior that corresponds to the travel characteristics similar to the travel characteristics of vehicle type B is forecast. Further, the vehicle-type-X driver model based on the vehicle-type-A driver model has travel characteristics similar to travel characteristics of vehicle type A. Therefore, when the vehicle-type-X driver model based on the vehicle-type-A driver model is used, a behavior that corresponds to the travel characteristics similar to the travel characteristics of vehicle type A is forecast.

The processor of server 1100 according to the present modification may determine whether a plurality of vehicle types that are predetermined and usable for transfer learning include vehicle type A and vehicle type B. In that case, when the processor determines that vehicle type A and vehicle type B are included, the processor builds a vehicle-type-A driver model and a vehicle-type-B driver model.

Consequently, a driver model of a vehicle type that is not usable for transfer learning is not built.

Other Exemplary Embodiments

Forecast behaviors are a "distance between a vehicle around an own vehicle and the own vehicle" and the like in the above exemplary embodiment and the modification of the above exemplary embodiment. However, the forecast behaviors also include a speed of a vehicle after s seconds, a distance between a vehicle around an own vehicle and the own vehicle, and a steering angle. In that case, numerical values that correspond to the behaviors are stored in behaviors of travel histories. The numerical values are learned with the neural network. Consequently, behaviors (a speed of a vehicle after s seconds, a distance between a vehicle around an own vehicle and the own vehicle, and a steering angle) in any travel situation are forecast.

In the above exemplary embodiment and the modification of the above exemplary embodiment, dedicated hardware may implement the components. Alternatively, execution of a software program suitable for the components may implement the components. The components may be implemented by a program executing unit, such as a central processing unit (CPU) or a processor. The program executing unit reads and executes a software program stored in a storage medium, such as a hard disk or a semiconductor memory. Software that implements the information processing system according to the above exemplary embodiment and the modification of the above exemplary embodiment is a program that causes a computer to perform the steps in FIG. 14.

In the above exemplary embodiment and the modification of the above exemplary embodiment, vehicle 1200*a* of vehicle type A and vehicle 1200*x* of vehicle type X have the same configuration. However, vehicle 1200*a* of vehicle type A and vehicle 1200*x* of vehicle type X may have different configurations. For example, only vehicle 1200*a* of vehicle type A may include format processing part 1202, and vehicle 1200*x* of vehicle type X may not include format processing part 1202. In that case, format processing part 1202 of vehicle type A converts a format of parameters that represent detected travel situations into a format that corresponds to a format of vehicle type X.

In the above exemplary embodiment and the modification of the above exemplary embodiment, a histogram (specifically, a temporary-behavior histogram) is used for transfer learning. However, the histogram may not be used, and any transfer learning may be possible. In the above exemplary embodiment and the modification of the above exemplary embodiment, a neural network is built as a driver model. However, a driver model that is not a neural network may be built.

In the above exemplary embodiment and the modification of the above exemplary embodiment, a vehicle-type-A driver model is transmitted to vehicles 1200*a* of vehicle type A. However, a vehicle-type-X driver model may be transmitted to vehicles 1200*a* of vehicle type A. For example, when vehicles 1200*a* of vehicle type A and vehicles 1200*x* of vehicle type X have substantially the same vehicle bodies and travel performance, a vehicle-type-X driver model may be transmitted to vehicles 1200*a* of vehicle type A. Travel-situation detector 1201 of vehicle type X has detection performance and reliability that are higher than detection performance and reliability of travel-situation detector 1201 of vehicle type A. For example, travel-situation detector 1201 of vehicle type A detects a distance between a vehicle around an own vehicle and the own vehicle by a unit of 5 m or 10 m. Travel-situation detector 1201 of vehicle type X detects a distance between a vehicle around an own vehicle and the own vehicle by a unit of 1 m. Therefore, a vehicle-type-X driver model built by transfer learning for a vehicle-type-A driver model has reliability that is higher than reliability of the vehicle-type-A driver model. Therefore, when forecasting part 1207 of vehicle type A uses the vehicle-type-X driver model to forecast behaviors, precision and reliability of forecast of behaviors are improved.

In the above exemplary embodiment and the modification of the above exemplary embodiment, vehicles 1200*a* of vehicle type A are regular vehicles and vehicles 1200*x* of vehicle type X are luxury vehicles. However, vehicles 1200*a* of vehicle type A may be sedans, and vehicles 1200*x* of vehicle type X may be minivans.

Information processing systems according to one or more aspects of the present invention have been described above with reference to the exemplary embodiment and the modification of the exemplary embodiment. However, the exemplary embodiment and the modification of the exemplary embodiment do not limit the present invention. The above exemplary embodiment and the modification of the above exemplary embodiment that are variously modified by a person skilled in the art fall within the scope of the present invention without departing from the spirit of the present invention. Further, an embodiment built by combination of components of the exemplary embodiment and components of the modification of the exemplary embodiment falls within the scope of the present invention without departing from the spirit of the present invention.

INDUSTRIAL APPLICABILITY

The present invention forecasts behaviors appropriate for vehicles. For example, the present invention is applicable to an information processing system for autonomous driving.

REFERENCE MARKS IN THE DRAWINGS

1000: information processing system
1100: server
1101: information receiving part
1102, 1102*a*: history-of-vehicle-type-A storing unit
1102*b*: history-of-vehicle-type-B storing unit
1102*c*: history-of-vehicle-type-C storing unit
1102*d*: history-of-vehicle-type-D storing unit
1103: history-of-vehicle-type-X storing unit
1104: learning part
1105: transfer-learning part
1121: temporarily forecasting part
1122: histogram generator
1123: learning processing part
1106: model storing unit
1107: model transmitting part
1200, 1200*a* 1200*x*: vehicle
1201: travel-situation detector
1202: format processing part
1203: history transmitting part
1204: history generating part
1205: model receiving part
1206: model storing unit
1207: forecasting part
1208: model selecting part
1209: interface
1210: vehicle controlling part

The invention claimed is:

1. An information processing system comprising:
   at least one processor;
   at least one first detector that detects a first surrounding situation that belongs to a first vehicle type; and
   at least one second detector that detects a second surrounding situation that belongs to a second vehicle type that is different from the first vehicle type,
   wherein
   the at least one first detector and the at least one second detector have different detection precisions, and
   the at least one processor
   generates at least one first travel history that includes the first surrounding situation detected by the at least one first detector, as a first travel situation of a first vehicle that belongs to the first vehicle type,
   receives the at least one first travel history from each of n vehicles that belong to the first vehicle type, where n is an integer that is larger than or equal to two,
   learns based on the at least one first travel history to build a first driver model that represents a relation between the first travel situation and a first behavior of each of the n vehicles that belong to the first vehicle type,
   generates at least one second travel history that includes the second surrounding situation detected by the at least one second detector, as a second travel situation of a second vehicle that belongs to the second vehicle type,
   receives the at least one second travel history from each of m vehicles that belong to the second vehicle type that is different from the first vehicle type, where m is an integer that is smaller than n,
   performs transfer learning in which the at least one second travel history is used for the first driver model to build a second driver model that represents relation between the second travel situation and a second behavior of each of the m vehicles that belong to the second vehicle type, and
   forecasts a first forecast behavior of the first vehicle that belongs to the first vehicle type based on the second driver model, when the second detector of the second vehicle type has the detection precision that is higher than that of the first detector of the first vehicle type.

2. The information processing system according to claim 1, wherein
   the at least one processor,
   when a first format of a first parameter that represents the first surrounding situation detected by the at least one first detector is different from a second format of a second parameter that represents the second surrounding situation detected by the at least one second detector,
   converts at least one of (i) the first format of the first parameter of the at least one first detector and (ii) the second format of the second parameter of the at least one second detector to generate the at least one first travel history and the at least one second travel history that each include the first travel situation and the second travel situation represented by a unified format.

3. The information processing system according to claim 2, wherein
   the at least one processor
   converts the first format of the first parameter of the at least one first detector and the second format of the second parameter of the at least one second detector into a predetermined format.

4. The information processing system according to claim 1, wherein
   the at least one processor
   forecasts a second forecast behavior of the second vehicle that belongs to the second vehicle type, and the second forecast behavior is the second behavior related to the second parameter that represents the second surrounding situation detected by the at least one second detector in the second driver model.

5. The information processing system according to claim 1, wherein
   the at least one processor includes:
   first processors of first vehicles that belong to the first vehicle type;
   second processors of second vehicles that belong to the second vehicle type; and
   a third processor of a server,
   wherein the first processors
   transmit, to the server, the at least one first travel history generated by travel of the first vehicles that belong to the first vehicle type,
   the second processors
   transmit, to the server, the at least one second travel history generated by travel of the second vehicles that belong to the second vehicle type, and
   the third processor
   receives the at least one first travel history from the first vehicles that belong to the first vehicle type, and receives the at least one second travel history from the second vehicles that belong to the second vehicle type.

6. The information processing system according to claim 5, wherein
   the third processor
   transmits the second driver model built to the second processors.

7. The information processing system according to of claim 1, wherein
   the at least one processor further
   receives at least one third travel history from each of k vehicles that belong to a third vehicle type, where k is an integer that is larger than m,
   learns based on the at least one third travel history to build a third driver model that represents a relation between a third travel situation and a third behavior of each of the k vehicles that belong to the third vehicle type, and
   receives a selection of the third driver model,
   wherein the second driver model is built by performing transfer learning in which the at least one second travel history is used for the third driver model.

8. The information processing system according to claim 7, wherein
   the at least one processor
   determines whether a plurality of vehicle types that are predetermined and usable for transfer learning include the first vehicle type and the third vehicle type.

9. A vehicle comprising the information processing system according to claim 1.

10. An information processing method using an information processing system, the information processing system including at least one first detector that detects a first surrounding situation that belongs to a first vehicle type with a first detection precision and at least one second detector that detects a second surrounding situation that belongs to a second vehicle type with a second detection precision, the first vehicle type is different from the second vehicle type, the at least one first detector and the at least one second detector have different detection precisions, the information processing method comprising:

generating at least one first travel history that includes the first surrounding situation detected by the at least one first detector, as a first travel situation of a first vehicle that belongs to the first vehicle type;

receiving the at least one first travel history from each of n vehicles that belong to the first vehicle type, where n is an integer that is larger than or equal to two;

learning based on the at least one first travel history to build a first driver model that represents a relation between the first travel situation and a first behavior of each of the n vehicles that belong to the first vehicle type;

generating at least one second travel history that includes the second surrounding situation detected by the at least one second detector, as a second travel situation of a second vehicle that belongs to the second vehicle type;

receiving the at least one second travel history from each of m vehicles that belong to the second vehicle type that is different from the first vehicle type, where m is an integer that is smaller than n;

performing transfer learning in which the at least one second travel history is used for the first driver model to build a second driver model that represents relation between the second travel situation and a second behavior of each of the m vehicles that belong to the second vehicle type; and forecasting a first forecast behavior of the first vehicle that belongs to the first vehicle type based on the second driver model, when the second detector of the second vehicle type has the detection precision that is higher than that of the first detector of the first vehicle type.

11. A non-transitory machine-readable recording medium that stores a program that causes a computer to execute:

causing at least one first detector to detect a first surrounding situation that belongs to a first vehicle type;

causing at least one second detector to detect a second surrounding situation that belongs to a second vehicle type that is different from the first vehicle type, wherein the at least one first detector and the at least one second detector have different detection precisions;

generating at least one first travel history that includes the first surrounding situation detected by the at least one first detector, as a first travel situation of a first vehicle that belongs to the first vehicle type;

receiving the at least one first travel history from each of n vehicles that belong to the first vehicle type, where n is an integer that is larger than or equal to two;

learning based on the at least one first travel history to build a first driver model that represents a relation between the first travel situation and a first behavior of each of the n vehicles that belong to the first vehicle type;

generating at least one second travel history that includes the second surrounding situation detected by the at least one second detector, as a second travel situation of a second vehicle that belongs to the second vehicle type;

receiving the at least one second travel history from each of m vehicles that belong to the second vehicle type that is different from the first vehicle type, where m is an integer that is smaller than n;

performing transfer learning in which the at least one second travel history is used for the first driver model to build a second driver model that represents relation between the second travel situation and a second behavior of each of the m vehicles that belong to the second vehicle type; and forecasting a first forecast behavior of the first vehicle that belongs to the first vehicle type based on the second driver model, when the second detector of the second vehicle type has the detection precision that is higher than that of the first detector of the first vehicle type.

* * * * *